3,146,799
PRESSURE-SENSITIVE ORGANOPOLYSILOXANE ELASTOMERS AND ARTICLES PRODUCED THEREFROM
Frank Fekete, Monroeville, Pa., assignor to Union Carbide Corporation, a corporation of New York
No Drawing. Filed Mar. 28, 1961, Ser. No. 98,748
32 Claims. (Cl. 138—125)

This invention relates to pressure-sensitive organopolysiloxane elastomers (silicone elastomers) and to composite articles produced therefrom. More particularly, the invention is directed to a novel class of organopolysiloxane compositions which can be cured to produce pressure-sensitive elastomers, which elastomers, in conjunction with solid base materials, provide useful composite articles. The invention is also directed to processes for preparing the pressure-sensitive organopolysiloxane elastomers and to methods for effecting bonding between such elastomers and solid materials.

This application is a continuation-in-part of my co-pending applications Serial No. 655,499, filed April 29, 1957; Serial No. 728,04, filed April 14, 1958; Serial Nos. 759,117, 759,118 and 759,119, all filed September 5, 1958, and Serial No. 88,019, filed February 9, 1961, which last application is a continuation of application Serial No. 728,098, filed April 14, 1958, all seven applications being now abandoned.

Many of the commercial applications of organopolysiloxane elastomers involve adhering them to various solid materials. For example, composite articles comprising an organopolysiloxane elastomer in combination with a sheet, cloth or fibrous matter made of a natural or synthetic material, have been widely employed in electrical insulation. Likewise organopolysiloxane elastomers have been employed in combination with various natural and synthetic materials in the form of gaskets, tapes, diaphragms, conveyor belts and like articles for various other applications. However, since organopolysiloxane elastomers heretofore known are characterized by adhesiveness toward another surface of the same elastomer and toward most other materials, considerable difficulty has been experienced in achieving an effective bond between such elastomers and other materials.

To overcome this difficulty, it has been proposed to pretreat the surfaces of such materials with a sizing or bonding agent which is capable of adhering to both the material and elastomer. By way of illustration, composite articles comprising an organopolysiloxane elastomer in combination with a metal have been prepared by coating the metal with a sizing or bonding agent, applying an organopolysiloxane gum compounded with a filler and a curing catalyst, and heating to cure said organopolysiloxane gum to an elastomer and bond said elastomer to the metal. Such procedures, while oftentimes effective in adhering organopolysiloxane elastomers to various materials, require a preliminary pretreating step and therefore have not been found entirely suitable.

Organopolysiloxane elastomers have been successfully bonded to certain woven and matted fabrics by similar procedures without the use of a sizing or bonding agent because of the tendency of the organopolysiloxane gum to flow into the interstices of the fabric. However, the organopolysiloxane elastomer-bonded fabrics formed thereby do not possess as high a crease strength (a measure of organopolysiloxane elastomer to fabric bond, hereinafter more fully described) as is desirable for many applications. Furthermore, the free elastomer surfaces of such coated fabrics remain adhesive in nature and cannot be made to adhere to other materials, as is desirable in many applications of such fabrics. Another disadvantage of such procedure is that previously cured elastomers cannot be made to adhere to the fabric itself without the use of a sizing or bonding agent.

Another method proposed to overcome the difficulty of achieving an effective bond between an organopolysiloxane elastomer and other materials involves the partial curing or vulcanization of conventional organopolysiloxane gums. The semi-cured elastomers resulting from such partial or undercuring procedures are tacky in nature and will adhere to various materials; however, such elastomers are difficult to handle and do not possess the desirable physical properties which characterize the fully-cured elastomers.

An object of this invention is to provide a pressure-sensitive organopolysiloxane elastomer.

A further object of the invention is to provide useful pressure-sensitive adhesive tapes comprising such organopolysiloxane elastomers.

A further object of this invention is to provide a means of bonding an organopolysiloxane elastomer to other solid materials which eliminates the use of sizing or bonding agents in effecting bondage.

A still further object of the invention is to provide composite articles comprising a solid material in combination with a fully cured organopolysiloxane elastomer bonded directly to this material.

A still further object of this invention is to provide composite articles having free elastomer surfaces which can be made to adhere to other materials.

A still further object of this invention is to provide composite articles comprising woven or matted fabrics in combination with a fully cured organopolysiloxane elastomer bonded directly thereto, said articles being characterized by high crease strengths.

Other objects and advantages of this invention are detailed in or will be apparent from the following specification and appended claims.

The present invention is based in part upon my discovery that when a combination of hydroxy-containing silicon compound and/or alkoxy-containing silicon compound and a boron-containing compound are admixed with an organopolysiloxane gum and the resulting compound or composition cured, there results or is produced a pressure-sensitive adhesive organopolysiloxane elastomer. The pressure-sensitive elastomers of my invention possess essentially all the desirable physical and electrical properties of the heretofore known organopolysiloxane elastomers and, in addition, will adhere upon the application of pressure to such materials as metal, fibers, sheets, cloth and other articles prepared from natural and synthetic substances.

One application of my improved organopolysiloxane elastomers is in the production of non-supported pressure-sensitive adhesive tapes, which are stretchable and retractable and which can be employed as insulating and reinforcing materials. Most important in this application is the extent to which such elastomers tend to adhere to or cohere with each other. Such cohesiveness is most noticeable by the fact that when cured and even post-cured elastomers of my invention are in contact with like elastomers, they can, by the application of heat, become fused into an essentially homgeneous mass. This characteristic of my elastomers is, as far as is known, not associated with presently available organopolysiloxane elastomers.

The present invention is further based upon my discovery that the above-described pressure-sensitive adhesive organopolysiloxane elastomers can be effectively bonded to other solid material to produce composite article without the necessity of employing an intermediate sizing or bonding agent. When such elastomers are bonded to woven or matted fabrics, the resulting coated fabrics are characterized by higher crease strengths. By the term "pressure-sensitive adhesive organopolysiloxane elastomers" as used herein is meant organopolysiloxane elastomers having the property or ability to adhere to various surfaces upon the application of slight pressure while remaining capable of being removed therefrom by the application of a pulling force. These elastomers are permanent pressure-sensitive adhesive materials and can be employed over and over again without losing any of their adhesive characteristics. Such elastomers readily adhere to each other as well as to other surfaces.

As far as is known, the organopolysiloxane elastomers of this invention can be bonded to any solid material. However, it has been found that when fluorinated thermoplastic polymers, such as polytetrafluoroethylene, are employed as the materials to be bonded, the bonds formed between such materials and the elastomers employed are not quite as strong as the bonds capable of being formed between such elastomers and other natural or synthetic materials. Among the materials which can be employed in preparing the composite articles of this invention may be mentioned metal and metal alloys, such as steel, phosphatized steel, aluminum, anodized aluminum, coppper, tin, brass, bronze, and the like; siliceous materials, such as glass cloth, ceramics, porcelain, and the like; organic fibers, such as wool, cotton, and the like; and any of the various synthetic organic fibers, such as nylon, Dacron, and the like; cellulosic materials, such as wood, paper, cellophane, cellulose acetate, cellulose butyrate, ethyl cellulose, butyl cellulose, and the like; organic elastomers, such as natural rubber, chloroprene, neoprene, butadiene-styrene copolymers, acrylonitrile-butadiene copolymers, and the like; polymeric substances, including addition-type polymers, such as polyethylene, polypropylene, polyvinyl chloride, polyvinylidene chloride, polyvinyl acetate, polyacrylonitrile, polymeric methyl methacrylate, and the like; the various copolymers of such materials; and condensation-type polymers, such as the solid reaction products of hexamethylenediamine with dibasic acids such as adipic acid and sebacic acid, the solid reaction products of methyl terephthalate and ethylene glycol, and polycondensation products of caprolactam, and the like.

In addition to adhering to other substances, the pressure-sensitive organopolysiloxane elastomers of this invention readily adhere to one another. It has been observed that when strips of such elastomers in the form of tapes are superimposed one upon the other so that the weight of the tapes constitutes the only form of pressure, the superimposed elastomer surfaces not only adhere to each other, but appear to flow together and fuse upon standing, with the bond therebetween increasing in strength. When conventional organopolysiloxane elastomers are superimposed one upon the other in a similar manner, no fusion or adhesion between the various elastomer surfaces takes place.

The composite articles of this invention can exist in a wide variety of forms. Thus, the elastomers employed in this invention can be bonded to various natural or synthetic materials in the shape of slabs, rods, films, sheets, strips, matted fibers, and the like, to produce a wide variety of articles such as ducts, gaskets, tapes, diaphragms, conveyor belts, and the like.

One form which the composite articles of this invention can take is that of a laminate in which plies of natural or synthetic materials are bonded to plies of organopolysiloxane elastomers. These laminated articles can be comprised of a multiplicity of plies of like or unlike natural or synthetic materials held together by a multiplicity of plies of organopolysiloxane elastomer, or they can be comprised of a single ply of a natural or synthetic material bonded to a single ply of elastomer. Such laminates can also comprise a composite of two plies of like or unlike natural or synthetic materials bonded together by a single ply of elastomer, or they can be comprised of two plies of elastomer coated on an intermediate ply of natural or synthetic material. When the elastomer forms an outer ply of such laminates, the free elastomer surface thereof can be caused to adhere to other materials, and additional plies of natural or synthetic materials can be bonded thereto. By continually adhering alternate plies of elastomer and other materials, laminates of any desired size and thickness can be produced. Such laminates can then be cut into any desired shape and employed as gaskets, tapes, diaphragms, conveyor belts, and in various other applications.

Another form which the composite articles of this invention can take is that of elastomer-coated articles, such as elastomer-coated transformers, electrical cables, and the like, whenever it is desirable to electrically or thermally insulate such articles. As the elastomers employed in this invention are resistant to cold and heat and deterioration by the elements, they can be suitably employed in composite articles comprising a metallic window frame, or like object, in combination with weather stripping composed of such elastomers. Such elastomers are also useful in preparing composite articles wherein vacuum-tight and pressure-tight seals are important, for example, in the manufacture of electrical discharge devices where they can be employed in sealing the casings containing the anodes and cathodes.

The composite articles of this invention find particular utility in the form of supported pressure-sensitive elastomer adhesive tapes. Glass cloth, aluminum foil, various natural or synthetic fabrics and other similar materials may be employed as the supporting base member of such tapes.

Because the elastomer surfaces of such tapes are pressure-sensitive adhesive materials, they can be easily wound about conduits, electrical cables, and various other objects to provide thermal and electrical insulation. By the application of heat, a permanent bond can be effected between such objects and the elastomer.

Most important in the application of such pressure-sensitive adhesive tapes is the extent to which the elastomer tends to cohere with itself. By way of illustration, when either unsupported tapes or supported tapes coated on both sides with pressure-sensitive adhesive organopolysiloxane elastomers are spirally wound about a mandrel, under tension, in an orderly overlapping manner, the wrapping remains in place and does not slip from the mandrel when the applied tension is removed. Instead, a fusion of the overlapped portions of the elastomer appears to take place with the bond therebetween increasing in strength up to a point. When conventional supported organopolysiloxane elastomer tapes are subjected to the same test, the elastomer fails to adhere to itself and the wrapping becomes loose and falls from the mandrel upon release of applied tension.

The phenomenon which occurs when my pressure-sensitive adhesive tapes are wrapped about an article such as a mandrel or finger of the human hand in an overlapping fashion, namely, the flow and tightening effect of the tape so as to cause an apparent increase in the pressure of the tape about the article, is not clearly known or fully understood. It has been observed that when pieces of my pressure-sensitive adhesive tapes are simply laid up in an overlapping fashion without tension and where the weight of the tape constitutes the only form of applied pressure the portions thereof not only adhere to each other but tend to cohere and appear to flow together and fuse upon standing with the bond therebetween increasing in strength up to a point. This tendency of my pressure-sensitive adhesive silicone tapes to cohere and fuse takes place regardless of whether such tapes are conventionally cured or whether they are subjected to an additional postcuring step.

It has been found that the rate of fusion and the strength of the bond between the overlapped elastomer portions of such unsupported or supported pressure-sensitive adhesive tapes increases upon the application of heat. Thus, when heated to temperature of about 200° F. and higher, the overlapped portions of such tapes fuse together into an essentially homogeneous cylindrical mass, and cannot be separated without damage to the elastomer. When tapes prepared from conventional organopolysiloxane elastomers are subjected to the same treatment, fusion of the overlapped elastomer portions of the tapes does not occur.

When the pressure-sensitive adhesive tapes of this invention are wound about a mandrel wrapped with a film of polytetrafluoroethylene, the bond formed between the elastomer surface of the tape and the polytetrafluoroethylene film is not quite as strong as the bond capable of being formed between such tapes and other natural or synthetic substances. When the wrapped mandrel is heated, the elastomer surfaces of the tape fuse. The fused cylindrical body resulting therefrom can then be slipped from the polytetrafluoroethylene by the application of pressure to obtain a duct-like structure which can be employed in a wide variety of applications, such as tubing for high temperature fluids or pipe couplings.

The preferred duct structures are those derived from supported pressure sensitive tapes coated on both sides with pressure-sensitive elastomer. The spirally wound supporting base member provides a conduit of solid material, to the surfaces of which is bonded the heat-cured elastomer portion of the supported tape.

The elastomer portion of such pressure-sensitive adhesive tapes can be filled with inorganic fillers such as finely-divided silica, with carbon black, or with mixtures of such materials. When inorganic fillers are employed, the elastomer is non-conductive, and the unsupported or supported tapes prepared therefrom can be employed as electrical insulators. On the other hand, when carbon black fillers are employed the elastomer is conductive, and the unsupported or supported tapes prepared therefrom can be employed as electrical semi-conductors.

The pressure-sensitive adhesive tapes of the present invention can be produced by calendering, extruding, molding or solution casting techniques. Thus, for example, the polysiloxane compounds of the present invention can be fed to a calender, calendered into sheets of varying thicknesses and subsequently cut into various widths. Preferably, the unsupported pressure-sensitive adhesive tapes of the invention are prepared in widths of from about one-quarter of an inch to about two inches. The strips prepared thereby can be cured by passage through a heated oven or by hot air techniques. In a like manner, improved polysiloxane compounds can be extruded through an appropriate die to a tape and the tape cured in a manner similar to that described above. When molding techniques are employed, the polysiloxane compounds are fed to an appropriate mold and subsequently heated to cause curing of the compound. When polysiloxane tapes are prepared by solution casting techniques, the polysiloxane compound is dissolved in a suitable solvent and the resulting solution poured onto a metal plate with the plate heated to temperatures sufficiently elevated to remove the solvent therefrom and to cause curing of the compound to an elastomer. The solution casting technique is particularly suitable for preparing extremely thin films.

Polysiloxane elastomers of my invention whether in the form of a tape or other article can be cured by conventional curing procedures. Thus, the polysiloxane compounds can be cured to an elastomer by heating the compound in a mold at temperatures of about 250° F. or higher for periods of time of fifteen minutes or longer with the aid of any of the conventional curing catalysts. When polysiloxane compounds are cured by hot air vulcanizing techniques, we prefer to employ as the catalysts such peroxides as dichlorobenzoyl peroxide, benzoyl peroxide, and dicumyl peroxide. Curing by hot air vulcanizing techniques is normally accomplished at temperatures of about 250° C. and higher for periods of about one-half minute and longer. When the improved compounds of my invention contain a carbon black filler, we prefer to employ such peroxides as dicumyl peroxide and di-tertiary-butyl peroxide as the curing agents.

Although the cured elastomers are pressure sensitive, they can usually be easily stripped from the mold. Some sticking may occur when mold cure is carried out at temperatures of 350° F. or higher. However, sticking can be almost completely eliminated through the use of a conventional mold release agent, such as a dimethylpolysiloxane oil, a diethylpolysiloxane oil or a dimethylpolysiloxane oil modified with phenylmethylsiloxy units or (beta-phenylethyl)methyl siloxy units.

The supported or unsupported pressure-sensitive elastomer adhesive tapes described are preferably prepared in the form of a roll. Thus, after curing the elastomer or the elastomer in combination with a suitable supporting member, the newly-formed pressure-sensitive adhesive tape can be fed to winding reels and wrapped about a core (preferably a core in the shape of a right circular cylinder) in overlapping fashion to produce a roll of tape of any desired size. Because of the pressure-sensitive adhesive surfaces of such tapes, it is preferred that the tape be wound upon itself with an interlayer such as paper or plastic film between the overlapping surfaces. While the elastomer exhibits a tendency to adhere to such surfaces, this tendency is not sufficient to prevent removal of the tape from the interlayer when occasion for its use arises. That is, due to the limited degree of adhesion which the elastomer exhibits toward the interlayer material, the concentric layers of tape can be easily unwound and the tape can thereafter be readily stripped away or removed from the interlayer material. Typical materials which can be employed as an interlayer in the production of rolls of supported organopolysiloxane elastomer adhesive tapes are paper, nylon, cellophane, and plastic materials such as the polymers and copolymers of vinyl chloride and polyvinylidene chloride, mylar (polyethylene terephthalate resin) and polyolefins, such as polyethylene and polypropylene. When paper is employed as the interlayer, it is preferred that it be treated or coated with wax, such as paraffin wax, or other material to limit the degree of adhesion that the elastomer exhibits toward the paper.

The interlayer materials described above can also be used to separate unrolled strips or flat sheets of pressure sensitive elastomers of this invention. This combination of a layer of pressure sensitive elastomer (either supported or unsupported) having at least one surface in contact with a layer of one of the materials toward which the elastomer exhibits a limited degree of adhesion provides an efficient means for storing or transporting the elastomer. The elastomer can be easily stripped away from such materials when desired.

The composite articles of this invention can be prepared in various ways. For example, a cured or postcured pressure-sensitive organopolysiloxane elastomer can be applied to the surface of a natural or synthetic material and adhesion effected between the elastomer and such material by the simple application of pressure. If it be desirable to form a multiply laminate, alternate layers of elastomer and natural or synthetic material can be superimposed one upon the other until the desired number of plies is obtained, and pressure applied to the outer surfaces of the laminate in order to effect adhesion.

The composite resulting from applying the cured elastomer to the solid material are satisfactory for many purposes.

Thus when composite articles of this invention are prepared by such procedure, comparatively strong bonds are effected by the application of relatively slight pressure. Thus, pressure-sensitive organopoylsiloxane elastomer sheets which have been applied to metal sheets under pressures of from 10 to 1000 pounds per square inch require a pulling force of from 2 to 10 pounds per square inch to separate such sheets from the metal.

In order to effect a more durable bond between a pressure-sensitive organopolysiloxane elastomer and a natural or synthetic material, it is necessary to heat the composite in addition to applying pressure. Temperatures ranging up to 480° F. and higher have been employed for such purpose with good results. Thus, when a pressure-sensitive elastomer is applied to a base member under pressure at a temperature of about 480° F., the resulting bond is often so adherent that the elastomer cannot be removed without damage thereto.

Another method of preparing the composite articles of this invention comprises applying to the surface of a natural or synthetic material an organopolysiloxane formulation comprising a diorgano-substituted polysiloxane, a combination of an alkoxy-containing silicon compound and/or a hydroxy-containing silicon compound, a boron-containing compound, a filler and a catalyst, and subsequently heating the resulting composite to a temperature sufficiently elevated to cure the organopolysiloxane formulation to an elastomer while at the same time firmly adhering the cured elastomer to said natural or synthetic material. In order to effect a more durable bond between the cured elastomer and said natural or synthetic material, it is preferable to apply pressure to the composite both prior to and during the curing of the organopolysiloxane formulation. Pressures of from about 5 to 1000 pounds per square inch and higher have been employed for such purpose with good results. Again, when adhesion is effected in this manner, the resulting bond is often so adherent that the elastomer cannot be removed without damage thereto.

Still another method of preparing the composite articles of this invention comprises coating a natural or synthetic material with a mixture or dispersion comprising a diorgano-substituted polysiloxane, a combination of an alkoxy-containing silicon compound and/or a hydroxy-containing silicon compound, a boron-containing compound, a filler, a catalyst and a suitable liquid dispersing agent, such as an aromatic hydrocarbon, including toluene, benzene, xylene, and the like. Such dispersions can be readily applied to the surface of a natural or synthetic material by conventional methods such as by dipping, spraying, brushing, and the like. The liquid dispersing agent is then evaporated and the coated material heated to a temperature sufficiently elevated to cure the deposited formulation to an elastomer while at the same time effecting adhesion of said elastomer to said material. If desired, additional coats may be applied by repeating this process.

While it is not necessary to use bonding agents in order to prepare the composite articles of this invention, it is desirable that the surface of the natural or synthetic material employed be clean. Cleaning can be accomplished by any means known in the particular arts relating to such materials.

The pressure-sensitive adhesive organopolysiloxane elastomers of the invention can be produced by adding a diorganopolysiloxane gum (also known in the art as a diorgano-substituted polysiloxane gum), a filler, and a boron-containing material together with a hydroxy-containing silicon material, and/or an alkoxy-containing silicon material, the latter two being added either separately or premixed, and catalyst to a two-roll mill, milling the ingredients until the filler, catalyst, boron-containing material, hydroxy-containing silicon material and/or alkoxy-containing silicon material are thoroughly dispersed within the gum. By way of illustration, an organopolysiloxane formulation curable to a highly-reinforcing, pressure-sensitive elastomer suitable for use as a general purpose stock can be produced by milling together on a two-roll mill, 6 parts by weight of an ethoxy-endblocked dimethylpolysiloxane oil showing an average of one ethoxy group bonded to each of the terminal silicon atoms, 6 parts by weight of a hydroxy-endblocked dimethylpolysiloxane oil having an average of one hydroxy group bonded to each of the terminal silicon atoms, 4 parts by weight of trimethyl borate, 45 parts by weight of finely-divided silica, 1 part by weight of di-tertiary-butyl peroxide, and 100 parts by weight of a linear polysiloxane gum containing 99.75 percent by weight dimethylsiloxane units and 0.25 percent by weight ethylvinylsiloxane units for a period of about fifteen minutes. The organopolysiloxane formulation so produced can then be removed from the mill and cured by heating to a temperature of about 340° F. for a period of about twenty minutes. Elastomers of any desired shape can be prepared by the use of suitable molds. The cured elastomers possess essentially the same physical and electrical characteristics as elastomers prepared from the same formulation free of a combination of alkoxy- and/or hydroxy-containing silicon compounds and a boron-containing compound, including comparable tensile strength, dielectric strength, elongation and tear-resistance properties. However, when such materials are incorporated therein, the resulting elastomer is adhesive in nature and upon the application of pressure will adhere to itself and a wide variety of natural and synthetic materials. When such elastomers are subjected to postcure treatments, they retain essentially all their desirable physical and electrical characteristics, including their adhesive and cohesive properties.

Thus, the elastomers of my invention include cured (and postcured) compounds possessing essentially all the desirable physical properties of comparably (conventionally) cured elastomers and are not characterized by a decrease in such properties as is found in the production of adhesive polysiloxane elastomers prepared by partial curing techniques.

A further characteristic of my elastomers is that they are uniformly adhesive throughout the cured composition. Thus, for example, a molded article of one inch in length, one inch in width, and one-half inch in thickness will adhere to metal or cloth upon the application of pressure regardless of which surface is applied thereto. On the other hand, when the article is cut in half, each of the new surfaces of the newly formed pieces are adhesive in nature. Thus, each of the pieces can be reunited along the new surfaces to again form the initial article and, in addition, each of the pieces will adhere upon the application of pressure through the newly-formed surfaces to metal, cloth, and the like materials.

When the filler employed in my elastomers comprises, for the most part, an inorganic filler such as finely-divided silica, the elastomers find particular use as electrical insulating media. Because such elastomers are pressure-sensitive adhesive materials they can be more readily employed in various applications without the danger of sliding or slipping due to vibration. On the other hand, when the filler employed comprises, for the most part, a carbon black filler, my elastomers find particular use in the production of electrical semi-conductors.

One use of my organopolysiloxane elastomers lies in the production of unsupported pressure-sensitive adhesive tapes. Such tapes can be filled with inorganic fillers such as silica, with carbon black, or with mixtures of silica and carbon black. The silica-filled pressure-sensitive adhesive organopolysiloxane tapes can be employed as insulating tapes while the carbon black filled pressure-sensitive adhesive tapes can be employed as conductive tapes.

The pressure-sensitive adhesive tapes of my invention are relatively non-tacky to the touch and are characterized by tensile strengths from about 700 to 1000 pounds per square inch. In addition, such tapes are further characterized by an elongation of between 300 and 400 percent and by tear resistance values of between 100 and 180 pounds per square inch (all values as determined by ASTM Test Procedures). For certain applications, tapes can be produced having lower tensile strengths, elongation and tear resistance properties; however, such tapes do not possess the overall usefulness of the above materials.

Unsupported pressure-sensitive adhesive polysiloxane tapes can be produced in varying widths and in thicknesses of from about 4 mils to about 60 mils and higher. Such tapes have been made in thicknesses as high as about 100 mils. It is preferred that the pressure-sensitive polysiloxane tapes of my invention be of a thickness of from about 5 to 40 mils.

The polysiloxane gums employed in preparing the pressure-sensitive organopolysiloxane elastomers of this invention are diorgano-substituted polysiloxanes containing hydrocarbon groups of one or more types. Such polysiloxanes (diorganopolysiloxane gums) can contain one or more types of substituents taken from the class of hydrogen atoms, hydrocarbon groups free of aliphatic unsaturation, olefinically-unsaturated hydrocarbon groups, halo-substituted hydrocarbon groups and cyanoalkyl groups. Preferably, the organo substituents of such polysiloxanes are composed of either (a) hydrocarbon groups of one or more types that are free of aliphatic unsaturation; (b) hydrocarbon groups of one or more types that are free of aliphatic unsaturation and olefinically-unsaturated hydrocarbon groups of one or more types; (c) hydrocarbon groups of one or more types that are free of aliphatic unsaturation and halo-substituted hydrocarbon groups of one or more types; or (d) hydrocarbon groups of one or more types that are free of aliphatic unsaturation and cyanoalkyl groups of one or more types.

Preferably, when hydrocarbon groups free of aliphatic unsaturation are present in such polysiloxanes, they are selected from the class consisting of methyl, ethyl, amyl and phenyl groups; the olefinically-unsaturated hydrocarbon groups, when present, are selected from the class consisting of vinyl, allyl and cyclohexenyl groups; the halo-substituted hydrocarbon groups, when present, are selected from the class consisting of chloro- and fluoro-substituted methyl, propyl, butyl and phenyl groups, including polychloro- and polyfluoro-substituted methyl, propyl, butyl and phenyl groups; and the cyanoalkyl groups, when present, are selected from the class consisting of beta-cyanoethyl, gamma-cyanopropyl and delta-cyanobutyl groups.

The diorgano-substituted polysiloxane gums employed in preparing the pressure-sensitive organopolysiloxane elastomers of this invention can be employed entirely as linear diorganopolysiloxane gums, or as linear diorganopolysiloxane gums modified with lower molecular weight polysiloxane oils. The linear polysiloxane gums can be employed as relatively short chain, low molecular weight polysiloxanes of such viscosity that the gums remain pourable liquids, or they can be employed as relatively long chain, high molecular weight polysiloxanes of such viscosity that the gum approaches the solid state and will barely flow when unconfined.

These diorganopolysiloxane gums can be prepared by conventional methods, for example, by the equilibration or coequilibration of one or more cyclic or linear diorganopolysiloxanes or by the hydrolysis of one or more hydrolyzable diorganosilane monomers. These methods are described in more detail in any abandoned application Serial No. 728,098, filed April 14, 1958.

The polysiloxane gums which can be employed as one of the components of my improved polysiloxane compounds and elastomers are preferably produced under conditions so controlled as to avoid (1) the incorporation therein of any significant amounts of trifunctional compounds, groups, or molecules to avoid cross-linking of linear or cyclic polysiloxane chains through silicon and oxygen atoms and (2) the incorporation therein of any significant amounts of monofunctional compounds, groups or molecules other than those specifically provided to serve as endblockers for limiting the degree of polymerization. Accordingly, my starting polysiloxane gums contain organo-pendant groups and silicon atoms in the ratio of 2.0 organo groups per silicon atom (approximately). Deviation from a ratio of 2 in any instance, for example, ratios from about 1.96 to about 2.05, with respect to the preferred practice will be insignificant for all practical purposes since it will be attributable to the presence of endblocking groups whose total numbers will be insignificant as compared with the total numbers of organo groups attached to the silicon atoms of the polysiloxane chains.

The linear diorganopolysiloxane gums employed in preparing the elastomers of this invention can be employed either alone or as a blend of two or more different gums. By suitably selecting and blending polysiloxane gums having differing organic substituents it is possible to achieve the effect of utilizing a single polysiloxane having two or more types of organic substituents. Blending can be effected in any suitable manner. For example, blending can be effected on or in rubber stock compounding rolls and mixers, either prior to or during the mixing and compounding of the other ingredients of the organopolysiloxane formulations employed in preparing the elastomers useful in this invention. Blending can also be effected through the use of solutions or dispersions of the ingredients to be mixed. When the linear diorgano-substituted polysiloxane gums employed in preparing the elastomers useful in this invention are modified with lower molecular weight polysiloxane oils, blending of the gums and oils can be effected in the manner described above, or in any other suitable manner.

The lower molecular weight polysiloxane oils used to modify such gums can be prepared by known hydrolysis methods. Thus, for example, dihydrocarbon-substituted polysiloxane oils can be prepared by the hydrolysis or cohydrolysis of one or more dihydrocarbon-substituted dihalo- or dialkoxysilanes in which the hydrocarbon groups attached to silicon can be the same or different.

When olefinically-unsaturated hydrocarbon groups are present in the linear polysiloxane gums employed in preparing the elastomers of this invention, they are preferably present in limited predetermined numbers, and are disposed at spaced intervals along the linear polysiloxane chains. Thus, when such gums consist of dihydrocarbon-substituted polysiloxanes having substituents composed of hydrocarbon groups free of aliphatic unsaturation and olefinically-unsaturated hydrocarbon groups, it is preferred that from 0.037 to 0.70 percent of the silicon atoms disposed along the linear polysiloxane chains be bonded to olefinically-unsaturated hydrocarbon groups (equivalent to about 0.05 to 1.0 percent by weight of olefinically-unsaturated hydrocarbon groups). In like manner, when such gums contain organo substituents in addition to hydrocarbon groups free of aliphatic unsaturation and olefinically unsaturated hydrocarbon group as, for example, halo-substituted hydrocarbon groups and/or cyanoalkyl groups, it is again preferred that from 0.037 to 0.70 percent of the silicon atoms present be bonded to olefinically-unsaturated hydrocarbon substituents. The introduction of such number of olefinically-unsaturated hydrocarbon groups into the polysiloxane contemplates the provision of from five to twenty crosslinks per molecule through such groups upon curing, but such groups can be present in greater or lesser amounts to provide cured elastomers of modified properties.

Oftentimes, it may be desirable to effect crosslinking of such polysiloxane gums through groups in addition to or in place of olefinically-unsaturated hydrocarbon groups. Such can be accomplished by the use of curing agents which do not exhibit a tendency to selectively and preferentially effect crosslinking through olefinically-unsaturated hydrocarbon groups. Catalysts suitable for use in curing organopolysiloxane gums to elastomers useful in this invention are hereinafter more fully described.

When the linear polysiloxane gums employed in preparing the elastomers of this invention consist of organo-substituted polysiloxanes having organo substituents composed of hydrocarbon groups and halo-substituted hydrocarbon groups it is preferred that such gums contain an average of from about 0.1 to about 1, preferably from about 0.25 to about 0.75, halo-substituted hydrocarbon groups per silicon atom. When such gums consist of organo-substituted polysiloxanes having organo substituents composed of hydrocarbon groups and cyanoalkyl groups, it is preferred that such gums contain an average of from about 0.1 to about 1, preferably from about 0.25 to about 0.75, cyanoalkyl groups per silicon atoms.

The alkoxy-containing silicon compounds employed in preparing the pressure-sensitive organopolysiloxane elastomers of this invention include alkoxy-containing silicates and polysilicates, and organo-substituted, alkoxy-containing silanes and polysiloxanes. Such compounds are preferably of relatively low molecular weight and contain silicon-bonded alkoxy groups in limited predetermined numbers. Preferably, the compounds employed are alkoxy-endblocked. When silanes and polysiloxanes are employed, as is preferred, such compounds also contain organo groups of one or more types bonded to the silicon or silicon atoms thereof through a carbon-to-silicon bond.

While the alkoxy-containing silanes and silicates employed in preparing the elastomers of this invention usually contain only a single silicon atom, the alkoxy-containing polysiloxanes employed, wherein the silicon atoms are joined by oxygen atoms, can contain from two up to thirty-five and more silicon atoms to the molecule. When polysiloxanes are employed, it is preferred that they be linear in structure (although they can be crosslinked) and contain not more than about twenty silicon atoms to the molecule.

A preferred class of alkoxy-containing siloxanes are those having the general formula:

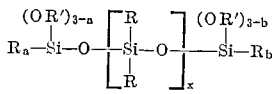

wherein R is a member selected from the group consisting of hydrocarbon radicals, halo-substituted hydrocarbon radicals, cyanoalkyl radicals, aminoalkyl radicals, and carboxyalkyl radicals; R' is a member selected from the group consisting of alkyl and aryl radicals; $a$ has a value from 0 to 2; $b$ has a value of from 0 to 3; $x$ has a value of from 2 to 35, and R as well as R' can be different group members in the molecule.

The alkoxy-containing silicon compounds employed in preparing the elastomers of this invention contain at least one, and preferably at least two, silicon-bonded alkoxy groups to the molecule. When polysiloxanes and polysilicates are employed, such compounds can contain up to six, and more, silicon-bonded alkoxy groups per molecule. Preferably, the alkoxy groups present in such alkoxy-containing silicon compounds are taken from the class consisting of methoxy, ethoxy, propoxy and butoxy groups.

Among the organo groups which can be present in the alkoxy-containing silanes and polysiloxanes employed in preparing the elastomers useful in this invention are hydrocarbon groups free of aliphatic unsaturation, olefinically-unsaturated hydrocarbon groups, halo-substituted hydrocarbon groups, aminoalkyl groups, cyanoalkyl groups, carbalkoxyalkyl groups, and the like. Preferably, the organo groups present in such compounds are taken from the class consisting of (a) hydrocarbon groups free of aliphatic unsaturation selected from the class consisting of methyl, ethyl and phenyl groups; (b) olefinically-unsaturated hydrocarbon groups selected from the class consisting of vinyl, allyl and cyclohexenyl groups; (c) halo-substituted hydrocarbon groups selected from the class consisting of chloro- and fluoro-substituted methyl, propyl, butyl and phenyl groups, including polychloro- and polyfluoro-substituted methyl, propyl, butyl and phenyl groups; (d) cyanoalkyl groups selected from the class consisting of beta-cyanoethyl, gamma-cyanopropyl, delta-cyanobutyl and epsilon-cyanopentyl groups; (e) aminoalkyl groups selected from the class consisting of gamma-aminopropyl, delta-aminobutyl and epsilon-aminopentyl groups; and (f) carbalkoxyalkyl groups selected from the class consisting of beta-carbalkoxyethyl, beta-carbalkoxypropyl and gamma-carbalkoxypropyl groups.

Illustrative of the alkoxy-containing silicates and polysilicates which can be employed in preparing the elastomers of this invention are tetraethylsilicate, as well as the condensed polysilicates thereof, and such silicates and polysilicates as diethoxy-di-(2-ethylhexanediol-1,3)-silicate, diethoxy-di(triethanolamine)silicate-N,N-dioleate, diethoxy-O,O-di-(2-ethylhexanediol-1,3)silicate, diethoxy-O,O-di(triethanolamine)silicate-N,N-dioleate, and the like.

Illustrative of the alkoxy-containing silanes which can be employed in preparing the elastomers of this invention are trimethylethoxysilane, dimethyldiethoxysilane, methyltriethoxysilane, ethyltriethoxysilane, diethyldimethoxysilane, triethylpropoxysilane, phenyltriethoxysilane, diphenyldiethoxysilane, triphenylethoxysilane, methylethyldipropoxysilane, methylphenyldiethoxysilane, vinyltriethoxysilane, ethylvinyldiethoxysilane, phenylvinyldiethoxysilane, divinyldipropoxysilane, allyltriethoxysilane, methallyldiethoxysilane, ethylcyclohexenyldiethoxysilane, chloromethyltriethoxysilane, gamma-chloropropyltriethoxysilane, gamma-chloropropylmethyldiethoxysilane, gamma-delta-dichlorobutyltriethoxysilane, para-chlorophenyltriethoxysilane, ortho-para-dichlorophenyltriethoxysilane, beta-cyanoethyltriethoxysilane, gamma-cyanopropylmethyldiethoxysilane, delta-cyanobutylphenyldipropoxysilane, gamma-aminopropyltriethoxysilane, gamma-aminopropylmethyldiethoxysilane, delta-aminobutyltripropoxysilane, delta-aminobutylmethyldiethoxysilane, epsilon-aminopentylphenyldiethoxysilane, beta-carbethoxyethyltriethoxysilane, beta-carbethoxyethylphenyldipropoxysilane, beta-carbethoxypropyltriethoxysilane, beta-carbethoxypropylmethyldiethoxysilane, gamma-carbethoxypropyltriethoxysilane, gamma-carbopropoxypropyltripropoxysilane, and the like.

These alkoxy-containing silanes can be used to prepare organo-substituted alkoxy-containing polysiloxanes by known hydrolysis or equilibration methods. For example, dihydrocarbon-substituted alkoxy-containing polysiloxanes can be prepared (1) by the controlled hydrolysis or cohydrolysis of one or more dihydrocarbon-substituted dialkoxysilanes in which the hydrocarbon groups attached to silicon may be the same or different; or (2) by the coequilibration of one or more low molecular weight cyclic dihydrocarbon-substituted polysiloxanes in which the hydrocarbon groups attached to silicon may be the same or different with one or more dihydrocarbon-substituted dialkoxysilanes in which the hydrocarbon groups attached to silicon may be the same or different under controlled conditions of heat and pressure whereby a linear dihydrocarbon-substituted alkoxy-endblocked polysiloxane oil is obtained.

More specifically, a low molecular weight linear ethoxy-endblocked dimethylpolysiloxane oil having an average of one ethoxy group bonded to each of the terminal silicon atoms of the polysiloxane chains thereof can be produced by admixing one mole of the cyclic tetramer of dimethylsiloxane with one mole of dimethyldiethoxysilane and a suitable catalyst, and heating the resulting mixture in a sealed pressure vessel at a temperature of about 200° C. for a period of about two hours.

By utilizing similar procedures, alkoxy-containing polysiloxanes having organo substituents other than, or in addition to, hydrocarbon groups can also be prepared. Alkoxy-containing silicon compounds having organo substituents other than hydrocarbon and halo-substituted hydrocarbon groups, such as aminoalkyl groups, cyanoalkyl groups and carbalkoxyalkyl groups are new compositions of matter and are disclosed and claimed in United States applications Serial Nos. 615,481 (now abandoned), 615,483 (now abandoned) and 615,492, all filed October 16, 1956.

The hydroxy-containing silicon compounds employed in preparing the pressure-sensitive organopolysiloxane elastomers of this invention include hydroxy-containing silicates and partially-condensed polysilicates thereof, and organo-substituted hydroxy-containing silanes and polysiloxanes. Such compounds are preferably of relatively low molecular weight and contain silicon-bonded hydroxy groups in limited predetermined numbers. Preferably, the compounds employed are hydroxy-endblocked. When silanes and polysiloxanes are employed, as is preferred, such compounds also contain organo groups of one or more types bonded to the silicon or silicon atoms thereof through a carbon-to-silicon bond. The organo groups which can be present in such compounds are the same as those which can be present in the alkoxy-containing silicon compounds described above.

While the hydroxy-containing silanes and silicates employed in preparing the elastomers of this invention usually contain only a single silicon atom, the hydroxy-containing polysiloxanes employed, wherein the silicon atoms are joined by oxygen atoms, can contain from two up to thirty-five and more, silicon atoms to the molecule, preferably from four to twenty silicon atoms per molecule. When polysiloxanes are employed, it is preferred that they be linear in structure (although they can be crosslinked) and contain from twelve to seventeen silicon atoms to the molecule.

The hydroxy-containing silicon compounds employed in preparing the elastomers of this invention contain at least one, and preferably at least two silicon-bonded, hydroxy groups to the molecule. When polysiloxanes and partially condensed polysilicates are employed, such compounds can contain up to six and more silicon-bonded hydroxy groups per molecule.

A preferred class of hydroxy-containing siloxanes are those having the general formula:

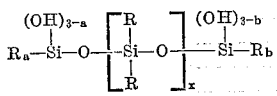

wherein R is a member selected from the group consisting of hydrocarbon radicals, halo-substituted hydrocarbon radicals, cyanoalkyl radicals, aminoalkyl radicals, and carboxyalkyl radicals; $a$ has a value from 0 to 2; $b$ has a value of from 0 to 3; $x$ has a value of from 2 to 35; and R can be different group members in the molecule.

Illustrative of the hydroxy-containing silicates and partially condensed polysilicates thereof which can be employed in preparing the elastomers of this invention are partially-hydrolyzed tetraethylsilicate, as well as the partially condensed polysilicates thereof, and such silicates and polysilicates as diethoxy-di(2-ethylhexanediol-1,3) silicate, diethoxy-O,O-di(2-ethylhexanediol-1,3)silicate, and the like.

Illustrative of the hydroxy-containing silanes which can be employed in preparing the elastomers of this invention are diphenyldihydroxysilane, trimethylhydroxysilane, phenyldimethylhydroxysilane, phenyltrihydroxysilane, methyltrihydroxysilane, and the like.

Organo-substituted hydroxy-containing polysiloxanes can be prepared by known hydrolysis or equilibration methods. For example, dihydroxycarbon-substituted hydroxy-containing polysiloxanes can be prepared (1) by the controlled hydrolysis or cohydrolysis of one or more dihydrocarbon-substituted dihalo- or dialkoxysilanes in which the hydrocarbon groups attached to silicon may be the same or different; or (2) by the coequilibration of one or more low molecular weight cyclic dihydrocarbon-substituted polysiloxanes in which the hydrocarbon groups attached to silicon may be the same or different with water under controlled conditions of heat and pressure whereby a linear dihydrocarbon-substituted hydroxy-endblocked polysiloxane oil is obtained.

More specifically, a low molecular weight linear hydroxy-endblocked dimethylpolysiloxane oil having an average of one hydroxy group bonded to each of the terminal silicon atoms of the polysiloxane chains thereof can be produced by admixing predetermined amounts of the cyclic tetramer of dimethylsiloxane and water, and heating the resulting mixture in a sealed pressure vessel at a temperature of about 300° C. for a period of about fourteen hours.

Generally, hydroxy-endblocked dimethylpolysiloxane oils have molecular weights ranging from about 300 to about 1500 and above, preferably from about 900 to about 1300, and contain hydroxy groups in an amount by weight of from about 1 percent to about 10 percent, preferably from about 2.4 percent to about 3.5 percent. When hydroxy-endblocked polysiloxane oils contain hydrocarbon substituents other than, or in addition to, methyl groups, the molecular weight of the oils will, of course, lie in a range above that described for dimethylpolysiloxane oils. In like manner, the hydroxy content of such polysiloxane oils will be relatively lower in value when the hydrocarbon substituents comprise groups other than, or in addition to, methyl groups.

The relative amounts of the various organic groups which can be present in the hydroxy-containing polysiloxanes employed in preparing the organopolysiloxane elastomers of this invention can vary over a wide range without materially affecting the properties of said elastomers. Preferably, the hydroxy-containing polysiloxanes employed are dihydrocarbon-substituted hydroxy-endblocked polysiloxane oils having hydrocarbon substituents consisting of one or more groups take from the class consisting of methyl, ethyl, phenyl, vinyl, allyl and cyclohexenyl groups.

The amount of alkoxy-containing silicon compound and/or hydroxy-containing silicon compound employed in preparing the elastomers of this invention is not narrowly critical and can vary over a wide range. Generally from as little as 1 part by weight and less to as much as 100 parts by weight and more of the sum of alkoxy-containing silicon compound and hydroxy-containing silicon compound per 100 parts by weight of the diorganopolysiloxane gum present can be advantageously employed. Preferably, such compounds are employed in amounts ranging from about 4 parts to about 80 parts by weight per 100 parts by weight of the polysiloxane present.

The amounts of combined total of hydroxy-containing polysiloxanes and alkoxy-containing polysiloxanes employed in the practice of my invention can be increased over and above the ranges described above to produce polysiloxane adhesives and pastes which can be deposited as films and subsequently cured to produce composite articles such as laminates. In a like manner, the improved organopolysiloxane elastomers of my invention can be dissolved in solvents such as the aromatic hydrocarbons including toluene, benzene, xylene, and the like, to produce solutions from which coatings and films of such organopolysiloxane elastomers can be deposited and subsequently cured.

In preparing the pressure-sensitive organopolysiloxane elastomers of this invention, the combination of alkoxy-containing silicon compound and/or hydroxy-containing silicon compound is most suitably employed partly as monomeric silane from the group consisting of alkoxysilanes and hydroxysilanes, and partly as polymeric siloxane from the group consisting of hydroxy-containing polysiloxanes and alkoxy-containing polysiloxanes. In such case, it is preferred that the monomeric silane be employed in amounts ranging from about 0.5 part to about 30 parts by weight per 100 parts by weight of the diorganopolysiloxane gum present and the polymeric siloxane be employed in amounts ranging from about 3.5 parts to about 50 parts by weight per 100 parts by weight of the polysiloxane present. Most preferably, the monomeric silane is employed in amounts ranging from about 1 part to about 10 parts by weight per 100 parts by weight of the polysiloxane present, and the polymeric siloxane is employed in amounts ranging from about 6 parts to about 20 parts by weight per 100 parts by weight of the polysiloxane present. It is to be understood, of course, that such combination can include three and four components as well as two components.

The boron-containing compounds employed in preparing the pressure-sensitive organopolysiloxane elastomers of this invention include all the known liquid and solid boron compounds which contain the elements boron, oxygen, hydrogen, carbon and nitrogen. Typical of such compounds are the boric acids, such as pyroboric acid, boric acid, and the like; the esters of the boric acids, such as trimethyl borate, triethyl borate, tri-n-propyl borate, tri-n-butyl borate, triamyl borate, tri-n-dodecyl borate, trihexylene glycol borate, tri(2-cyclohexylcyclohexyl)borate, tri(di-isobutylcarbinyl)borate, tristearyl borate, trioleyl borate, triphenyl borate, tri-o-cresyl borate, 2,6-di-tertiary-butyl-p-cresyl-diallyl borate, 2,6-di-tertiary-butyl-p-cresyl-di-2-ethylhexyl borate, 2,6-di-tertiary-butyl-p-cresyl-di-n-butyl borate, and the like; the anhydride of boric acid, namely, boron anhydride (boric anhydride, $B_2O_3$); the boron hydrides, such as pentaborane ($B_5H_9$), hexaborane ($B_6H_9$), decaborane ($B_{10}H_{14}$), and the like; the complexes formed by such hydrides with ammonia and other nitrogen compounds, such as triethanolamine borate, tri-isopropanolamine borate, and the complex formed between diborane and ammonia ($B_2H_6 \cdot 2NH_3$); the complexes formed by such hydrides with hydrocarbon compounds, such as diphenyldecaborane, and the like; and the alkali and alkaline earth metal derivatives or complexes of the boric acids, such as sodium meta-borate, potassium penta-borate, magnesium borate, and the like.

The boron-containing compounds employed in preparing the elastomers of this invention preferably contain at least one oxygen atom in addition to at least one boron atom. Illustrative of such compounds are the boric acids, such as pyroboric acid, boric acid, and the like. The most suitable boron-containing compounds are those boron compounds which contain only boron, oxygen and hydrogen atoms, such as the boric acids, or those boron compounds which contain only boron, oxygen, hydrogen and carbon atoms.

The amount of boron-containing compound employed in preparing the elastomers of this invention is not narrowly critical and can vary over a wide range. Generally from as little as 0.05 part by weight and less to as much as 10 parts by weight and more of boron-containing compound per 100 parts by weight of diorganopolysiloxane gum present can be advantageously employed. Preferably, such compounds are employed in amounts ranging from about 0.1 part to about 4 parts by weight per 100 parts by weight of polysiloxane present.

The fillers employed in preparing the pressure-sensitive organopolysiloxane elastomers of this invention are those highly reinforcing carbon black and inorganic compounds heretofore employed as fillers in organopolysiloxane elastomers in accordance with customary procedures. Such carbon black and inorganic compounds can be employed either alone or in any suitable combination. If desired, such compounds can be treated with modifying agents, such as the hydrolyzable hydrocarbon silanes, to improve their surface characteristics. When inorganic fillers are employed in preparing the elastomers useful in this invention, it is preferable that such fillers be finely-divided, silica-base materials having a particle diameter of less than 500 millimicrons and a surface area of greater than 50 square meters per gram. However, inorganic filler materials having a composition or particle diameter and surface area other than those preferred can also be employed, either alone or in combination with the preferred fillers. Thus, such filler materials as titania, iron oxide, aluminum oxide, aluminum silicate, zinc oxide, zirconium silicate, barium sulfate-zinc sulfide diatomaceous earth, calcium carbonate and quartz can be employed either alone or in combination with the finely-divided, silica-base fillers described.

The amount of highly reinforcing silica employed as filler in preparing the elastomers of this invention depends upon the tensile strength and hardness properties desired in the elastomer. By way of illustration, where high tensile strength and high hardness properties are required, large amounts of highly reinforcing silica are employed, together with smaller amounts of other type fillers, if such be desired. Where high tensile strength and high hardness properties are not as important, for example, when the elastomers are to be employed as coatings or cable compounds, lesser amounts of highly reinforcing silica can be employed together with larger amounts of other types of fillers.

When the highly reinforcing silica fillers employed in preparing the elastomers of this invention are highly acidic in nature, such as when they have a pH of 4 or less, it is oftentimes desirable to add materials thereto which tend to neutralize such acidity. In such instances, such buffers as calcium zirconate, barium zirconate, calcium silicate and other alkaline earth compounds or other type buffers can be added in appropriate amounts to the filler or to the curable organopolysiloxane formulation containing such filler.

Following are two lists of suitable inorganic fillers, one setting forth filler names and properties and the other setting forth the filler names and chemical compositions. These lists include filler materials of the type which can be employed alone or in combination with the preferred silica fillers.

DESCRIPTION OF VARIOUS MATERIALS USED FOR ELASTOMER FILLERS

| Commercial designation: | Chemical composition |
|---|---|
| Santocel "CS" | Finely-divided silica. |
| Aerosil or Cab-O-Sil | Finely-divided very pure silica. |
| HiSil X-303 | Finely-divided silica. |
| Dicalite | Diatomaceous silica. |
| Superfloss | Diatomaceous silica. |
| Celite 270 | Diatomaceous silica. |
| Iceberg | Aluminum silicate. |
| Witcarb R | Calcium carbonate. |
|  | Zinc oxide. |
| Superpax | Zirconium silicate. |
| Titanox RA | Titania. |
|  | Barium sulfate-zinc sulfate. |
| FeO RY-2196 | Iron oxide. |
| Gamaco | Calcium carbonate. |
| Whitex | Aluminum silicate. |
| Valron | Finely-divided silica having surface-bonded alkoxy groups. |
| Alon C | Fine particle size alumina. |

FILLER PROPERTIES

| Filler | Particle diameter (millimicrons) | Surface area, sq. m. per gram | Approx. pH | Sp. gr. |
|---|---|---|---|---|
| Santocel "CS" | 30 | 110-150 | 3.4-4.5 | 2.2 |
| HiSil X-303 | 20-35 | 140-160 | 7.0-8.0 | 1.95 |
| Aerosil | 15-20 | 175-200 | 3.0-6.0 | 2.0 |
| Valron | 8-10 | 285-335 | 6.0-7.5 | 1.86 |
| Witcarb R | 30-50 | 32 | 11.3 | 2.65 |
| Titanox RA | 300-400 |  | 7.0 | 4.2 |
| Alon C | 20-40 | 50-120 |  | 3.6 |
| Gamaco | 100-150 |  | 4.5-7.0 |  |

I may employ and suitable carbon black as a filler in preparing organopolysiloxane elastomers in accordance with the invention. Furnace blacks can be employed satisfactorily, particularly high-abrasion furnace blacks, in elastomer production procedures involving compounding organopolysiloxane gum with carbon black and specific curing agents, subjecting the compound or composition to a mold cure and, thereafter, subjecting the cured product to postcure heat-aging treatment.

It has been found that the capacity of an available carbon black product to function effectively as a filler is influenced by its particle size, hydrogen ion concentration and volatile matter content. For example, carbon black products having particles larger than about 850 A. provide low reinforcement. In general, carbon black products having particles larger than 850 A. or smaller than 300 A., or having a volatile matter content higher than about 20 percent by weight, or a hydrogen ion concentration lower than that corresponding to a pH of about 9.0 (as indicated by results obtained in measuring hydrogen ion concentrations of water dispersions of carbon blacks in accordance with the standard procedures employed by carbon black manufacturers) cannot be advantageously employed as fillers without having been subjected to certain preliminary corrective treatments prior to curing. Such treatments include precure heat-aging and/or treatment with an alkaline agent or acid acceptor. Thus, channel blacks, being acid in reaction and having a relatively high volatile matter content, require suitable precure corrective treatments in order to condition them for effective use. The acetylene blacks can also be employed. The following table contains a list of suitable carbon black fillers together with the names and properties thereof.

CARBON BLACK FILLERS

| Commercial designation | pH | Particle size (A) | Volatiles (wt.-percent) |
|---|---|---|---|
| Micronex Mark II | | 280 | 5.5 |
| Micronex | 4.4 | 290 | 5.5 |
| Micronex W-6 | 4.8 | 220 | 5.0 |
| Spheron N | 4.5 | 345 | 5.0 |
| Spheron 9 | 3.8 | 300 | 6.0 |
| Wyex | 4.5 | 270 | 1.2 |
| Aromex 115 | 9.3 | | |
| Statex 125 | | 430 | 0.5 |
| Statex B | 9.3 | 580 | 0.5 |
| Statex 93 | 9.5 | 850 | 0.5 |
| Furnex | 10.6 | 3,000 | |
| Thermax | 7.6 | 280 | 1.0 |
| Statex R | 9.0 | 360 | 1.1 |
| Philblack O | 9.1 | 590 | 1.1 |
| Philblack A | 9.7 | 330 | 2.0 |
| Continex | 9.5 | 745 | |
| Sterling V | | 300 | 1.2 |
| Aromex | 9.3 | 365 | 1.0 |
| Vulcan 3 | 9.0 | | |

It is to be understood that in the practice of my invention any suitable combination of carbon black and an inorganic filler can be employed. In a like manner, I can employ carbon black and inorganic filler either alone or in combination with each other which have been treated with modifying agents, such as the hydrolyzable hydrocarbon silanes, to improve the surface characteristics thereof.

The compound employed as curing catalysts in preparing the pressure-sensitive organopolysiloxane elastomers useful in this invention include all the compounds heretofore employed as curing catalysts in preparing organopolysiloxane elastomers in accordance with customary procedures. When curing of the diorgano-substituted polysiloxane gum is to be effected through olefinically-unsaturated hydrocarbon groups, the preferred curing agents are those organic peroxides which exhibit a tendency to selectively and preferentially effect crosslinking through such groups. Especially suitable for this purpose are the alkyl peroxides which can be graphically depicted by the structural formulas:

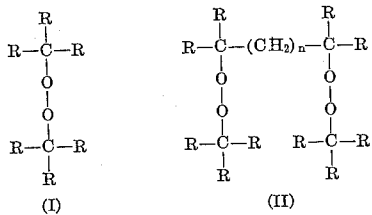

wherein R represents the same or different alkyl or aryl-substituted alkyl groups, and $n$ is zero or a larger integer.

Specific examples of such curing catalysts include di-tertiary-butyl peroxide; tertiary-butyl-triethylmethyl peroxide; dicumyl peroxide; tertiary-butyl-tertiary-triptyl peroxide, the composition of which is represented by the structural formula:

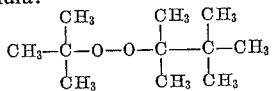

The use of alkyl peroxides in effecting crosslinking of organopolysiloxane gums through olefinically-unsaturated hydrocarbon groups is disclosed and claimed in the copending United States application of D. L. Bailey, W. T. Black and M. L. Dunham, Serial No. 470,834, filed November 23, 1954.

Organic peroxides which do not exhibit a tendency to selectively and preferentially effect crosslinking through olefinically-unsaturated hydrocarbon groups can also be employed as curing catalysts in preparing the pressure-sensitive organopolysiloxane elastomers useful in this invention. By employing such peroxides in appropriate amounts it is possible to effect curing solely through groups free of aliphatic unsaturation (for example through methyl groups), or through groups free of aliphatic unsaturation in addition to olefinically-unsaturated hydrocarbon groups. Typical of such peroxides are the aryl peroxides, such as benzoyl peroxide, and the like; mixed alkyl-aryl peroxides, such as tertiary butyl perbenzoate, and the like; chloro-aryl peroxides, such as 1,4-dichlorobenzoyl peroxide, 2,4-dichlorobenzoyl peroxide, mono-chlorobenzoyl peroxide, and the like.

The choice of catalyst employed in effecting curing of an organopolysiloxane formulation depends upon the fillers present in such formulation and the manner in which curing is sought to be accomplished, as well as upon the particular groups through which curing is sought to be accomplished. Thus, organic peroxides such as benzoyl peroxide, dichlorobenzoyl peroxide and dicumyl peroxide are particularly suitable as catalysts when curing is to be accomplished by hot air vulcanizing techniques. When the formulation to be cured contains a carbon black filler, it is preferable to employ such peroxides as dicumyl peroxide and di-tertiary-butyl peroxide as curing catalysts.

The amount of curing catalyst employed in preparing the elastomers useful in this invention can vary over a wide range depending upon the degree of cure desired in the elastomer. For most applications, a catalyst concentration of between about 0.5 part by weight and about 5.0 part by weight per 100 parts by weight of diorganopolysiloxane gum is satisfactory.

As described hereinabove, curing of the organopolysiloxane formulations employed in preparing the pressure-sensitive elastomers of this invention can be accomplished by conventional curing procedures, such as by heating in a mold at a temperature of about 250 F. for a period of about fifteen minutes with the aid of any conventional curing catalyst, or by hot air vulcanizing techniques at a temperature of about 250° C. for a period of about one-half minute.

It is sometimes desirable to age a mixture of a di-organo-substituted polysiloxane, alkoxy-containing silicon compound, hydroxy-containing silicon compound, boron-containing compound and filler prior to compounding such mixture with a catalyst and curing. Aging for a period of from about one day to one week at room temperature, or heat-aging at an elevated temperature (above about 250° F.) for a period of from about one to two hours or more provide opportunity for better wetting of the filler by the polysiloxane. In addition, precure heat-aging effectively eliminates objectionable volatile matter such as water and absorbed gases (carried into the mixture by the filler) at a stage wherein distortion resulting from gas elimination is not harmful, and thus reduces the amount of gas that must be eliminated by postcure heat-aging at a time when density and structural form must be retained.

At the conclusion of such aging treatments, a curing catalyst can be incorporated into the mixture and the resulting mixture heat-cured to a pressure-sensitive adhesive elastomer. If desired, the elastomer may then be subjected to postcure heat-aging. While such postcure treatments serve to stabilize the physical properties of the elastomer and to improve its electrical properties, they do not have a detrimental effect on the pressure-sensitive adhesive properties of the elastomer. Postcuring can be conducted by heating at a temperature of about 350° F., preferably at a temperature of about 480° F., for a period of about twenty-four hours.

The following examples are illustrative of the manner of preparing composite articles in accordance with this invention. The terms and expressions employed in the examples and throughout this specification are to be interpreted as indicated in the Glossary immediately preceding the examples. In the examples all proportions are in parts by weight unless specifically stated otherwise.

GLOSSARY (A) *Miniature penetrometer.*—The miniature penetrometer used in determining the hardness of organopolysiloxane gums is a modification of the standard miniature penetrometer used in measuring the hardness or viscosity of a plastic substance, such as asphalt, made in accordance with suggestions contained in the article "Miniature Penetrometer for Determining the Consistency of Lubricating Greases" by Gus Kaufman, W. J. Finn, and R. J. Harrington, Industrial and Engineering Chemistry, Analytical Edition, 11, 108–110, 1939.

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

An organopolysiloxane gum is tested for hardness by lowering the penetrometer cone with the plunger into contact with the surface of the gum with the indicator reading zero. Then the penetrometer cone with its plunger is released to permit downward movement under the influence of gravity for a period of ten seconds, and the depth of penetration is shown in millimeters on an indicator associated with the device. The indicated penetration is identified as the miniature penetrometer reading (MPR).

(B) *Elongation (ASTM D–412–51T).*—Amount of stretch of a sample under a tensile force expressed as a percentage of the original length:

$$\frac{(\text{Stretched length} - \text{original length})}{\text{Original length}} \times 100$$

(C) *Hardness (ASTM D–676–49T).*—Degree of indentation produced by a plunger or indentor under a specific load. Measured with a Shore A Durometer. The values range from zero to maximum hardness of 100.

(D) *Tensile strength (ASTM D–412–49T).*—The force necessary to rupture a rubber specimen when stretched to the breaking point divided by the original cross-sectional area (lb./sq. inch).

(E) *Tear strength (ASTM D–624–54).*—Similar to tensile test, except that a different "right angle" or "C" dumbbell (crescent) shape is used. Sample tears at the right angle. Force required to tear specimen, divided by the thickness of the specimen is the tear strength. (lb./in.)

(F) *Crease strength.*—The tensile force required to break a one-inch wide specimen of a coated fabric which has been deliberately creased by bending the coated fabric against itself through a 180 degree bend, and applying a specified weight along the crease thus formed. This property is expressed in terms of lb./inch. The method used for testing is specified in Navy Specification MIL–C–2194B, in sections 3.8.3.2 and 4.6.18 and amendments thereto.

(G) *Dielectric strength.*—The electrical strength required to puncture a sample of known thickness. This property is expressed in terms of volts/mil thickness. The method used for testing is specified in Navy Specification MIL–C–915A in sections 4.8.3.4 and 4.8.19.2.

(H) *Compression set (ASTM D–395–52T).*—Degree of failure of a sample to return to its original size after removal of a deforming force.

Compression set tests are run by compressing a 1.129 inch diameter of 0.500 inch high cylindrical specimen either under a constant load (Method A) or at a definite fixed deflection (Method B). After the specimen has been compressed, it may be subjected to an elevated temperature for a fixed time (usually twenty-two hours at 70° C.), then the load is released; after a thirty minute rest, the permanent change in the height of the specimen is measured and the percent set calculated. A small value is desirable.

Compression set is expressed as percent of original deflection in Method B.

Compression set is expressed as percent of original thickness in Method A.

(I) *Percent set at break.*—The degree to which an elastometer subjected to a tensile force is deformed after removal of such force. It is determined by subtracting the original length of the necked-down portion of a specimen from the pieced-together length of the same portion after rupture and dividing the value by the original length.

Example 1

A relatively soft ethoxy-endblocked linear polysiloxane gum containing 99.65 percent by weight dimethylsiloxane units and 0.35 percent by weight ethylvinylsiloxane units was prepared by mixing 29,800 grams of octamethylcyclotetrasiloxane with 4 grams of tetramethyldiethoxydisiloxane and 300 grams of a low molecular weight polysiloxane containing 28 percent by weight ethylvinylsiloxane units and 72 percent by weight dimethylsiloxane units with stirring to thoroughly mix the components; heating the mixture to a temperature of 145° C.; adding to the mixture a solution of potassium silanolate as catalyst in an amount sufficient to provide 30 parts of potassium ion per million parts of the mixture; stirring the resulting mixture for ten minutes, and then heating said mixture in a sealed pressure vessel at a temperature of 150° C. for one hour and forty-five minutes. After heating, the contents of the vessel were allowed to cool to room temperature. The linear polysiloxane gum obtained thereby had a hardness corresponding to a miniature penetrometer reading of 78 at room temperature.

An ethoxy-endblocked dimethylpolysiloxane oil having an average of one ethoxy group bonded to each of the terminal silicon atoms of the polysiloxane chains thereof was prepared by mixing 700 grams of dimethyldiethoxysilane and 2750 grams of a mixture of cyclic dimethylsiloxanes (including the cyclic trimer, tetramer, and the like); heating the resulting mixture with stirring to a temperature of 80° C.; adding to the mixture 3.5 grams of tetramethyl ammonium hydroxide dispersed in 50 grams of a mixture of cyclic dimethylsiloxanes (equivalent to a potassium ion concentration of 20 parts per million parts of the overall mixture); and heating the newly formed mixture at a temperature of 85° C. for two and one-half hours, and then at a temperature of 200° C. for three hours and twenty minutes. The mixture was allowed to cool to room temperature and was then filtered. The product obtained thereby comprised 3065 grams of a mono-ethoxy-endblocked dimethylpolysiloxane oil having an average molecular weight of about 880 and an average ethoxy content of about 10 percent by weight.

Following this procedure, other ethoxy-endblocked dimethylpolysiloxane oils varying in average molecular weight from about 700 to about 1200 and having an average ethoxy content of from about 8 to about 15 percent by weight were also prepared. In some instances, ethyltriethoxysilane was employed as the endblocking compound leading to the production of ethoxy-endblocked oils having an average of 1.5 ethoxy groups bonded to each of the terminal silicon atoms of the polysiloxane chains thereof.

A hydroxy-endblocked dimethylpolysiloxane oil having an average of one hydroxy group bonded to each of the terminal silicon atoms of the polysiloxane chains thereof was prepared by mixing predetermined amounts of the cyclic tetramer of dimethylsiloxane and water, and heating the resulting mixture in a sealed pressure vessel at a temperature of about 300° C. for about fourteen hours to obtain a linear oil having an average molecular weight of about 1050 and an average hydroxyl content of about 3.2 percent by weight. Following this procedure, other similar hydroxy-endblocked dimethylpolysiloxane oils were prepared.

Starting with the polysiloxane gum prepared above consisting of dimethylsiloxane units and ethylvinylsiloxane units, an unmodified organopolysiloxane compound was prepared by adding thereto in the compounding procedure conducted on a two-roll mill, a finely-divided silica filler, Cab-O-Sil. The following modifications with this base compound were prepared and recorded in Table 1–1 shown below.

TABLE 1-1

|  | A-1 | B-1 | C-1 | D-1 | E-1 | F-1 |
|---|---|---|---|---|---|---|
| Parts polysiloxane gum | 100 | 100 | 100 | 100 | 100 | 100 |
| Parts filler | 40 | 40 | 40 | 40 | 40 | 40 |
| Parts catalyst [1] | 1.2 | 1.2 | 1.2 | 1.2 | 1.2 | 1.2 |
| Parts boric acid | 0 | 0 | 0.5 | 0.5 | 0.75 | 0.5 |
| Parts ethyltriethoxysilane | 0 | 0 | 0 | 0 | 3.6 | 1.2 |
| Parts ethoxy-endblocked dimethylpolysiloxane oil [2] | 0 | 6 | 0 | 6 | 6 | 6 |
| Parts OH endblocked dimethylpolysiloxane oil [3] | 0 | 6 | 0 | 6 | 6 | 6 |

[1] Di-tertiary-butyl peroxide.
[2] An ethoxy endblocked dimethylpolysiloxane oil having an average of one ethoxy group per terminal silicon atom and having an ethoxy group content from 12 to 15 percent by weight.
[3] A hydroxy endblocked dimethylpolysiloxane oil having an average of one hydroxy group per terminal silicon atom and having hydroxy content of 2.5 to 3.2 percent by weight.

The above formulations were mold-cured for a period of fifteen minutes at a temperature of 340° F. and postcured for a period of twenty-four hours at a temperature of 480° F. The physical properties of each of the cured specimens were determined and appear in the table below.

TABLE 1-2

| Recipe | Hardness (Shore A) | Tensile strength (p.s.i.) | Elongation (percent) | Tear resistance, lb./in. | Percent permanent set |
|---|---|---|---|---|---|
| A-1 | 76 | 915 | 200 | 75 | 0 |
| B-1 | 68 | 940 | 325 | 95 | 0 |
| C-1 | 66 | 800 | 265 | 68 | 10 |
| D-1 | 63 | 910 | 300 | 98 | 10 |
| E-1 | 68 | 820 | 375 | 109 | 20 |
| F-1 | 66 | 1,050 | 430 | 105 | 20 |

The addition of small amounts of ferric oxide as, for example, from 1 to 4 or 5 parts per 100 parts of the polysiloxane gum (preferably 2 parts) serves to stabilize the organopolysiloxane compounds during curing and heat-aging procedures. By so doing, less difficulty is encountered in the curing steps. By way of illustration, 2 parts by weight of ferric oxide were compounded with recipes E–1 and F–1 and the new formulations cured, postcured and tested for physical properties as described above. The data obtained appears below.

| Recipe | Hardness (Shore A) | Tensile strength (p.s.i.) | Elongation (percent) | Tear resistance, lb./in. | Percent permanent set |
|---|---|---|---|---|---|
| E-1 | 68 | 1,020 | 390 | 122 | 20 |
| F-1 | 69 | 870 | 330 | 112 | 10 |

The ruptured dumbbell shaped specimens employed in the tensile strength determinations (see Table 1–2) were then placed in overlapping fashion (with the wider portions thereof superimposed to an extent of at least one-half inch) and pressed together by a force exerted by the thumb and forefinger of the technician to determine whether the elastomers of each of the formulations were pressure-sensitive adhesive materials. The ruptured portions of specimens prepared from recipes A–1 and B–1 exhibited no tendency to adhere to each other. The ruptured portions of specimens prepared from recipe C–1 exhibited little or no tendency to adhere to each other, while the ruptured portions of specimens prepared from recipes D–1 through F–1 exhibited a strong tendency to adhere to each other. More specifically, when the narrow ends of the superimposed portions of the specimens prepared from recipes D–1 through F–1 were placed in the jaws of a conventional tensile testing apparatus (a Scott Testing Apparatus), forces ranging from 7 to 18 pounds were required to either pull or separate the superimposed portions apart. On the other hand, the superimposed portions prepared from recipes A–1 and B–1 did not, as indicated above, exhibit any tendency to adhere while the superimposed portions prepared from recipe C–1 did not adhere to an extent sufficient to obtain a reading on the testing apparatus. Recipes E–1 and F–1 both ferric oxide modified and unmodified displayed excellent pressure-sensitive adhesive characteristics. Shear adhesion values for these elastomers as measured on a Scott Tester were between 10 and 17 pounds.

*Example 2*

Starting with the polysiloxane gum, prepared in Example 1 above, consisting of dimethylsiloxane units and ethylvinyl siloxane units, an unmodified organopolysiloxane compound was prepared by adding thereto in the compounding procedure conducted on a two-roll mill, a finely-divided silica filler Cab-O-Sil. The following modifications with this base compound were prepared and recorded in Table 2–1 shown below.

TABLE 2-1

|  | Recipe | | | |
|---|---|---|---|---|
|  | G-1 | H-1 | I-1 | J-1 |
| Parts polysiloxane gum | 100 | 100 | 100 | 100 |
| Parts filler | 40 | 40 | 40 | 40 |
| Parts catalyst [1] | 1.2 | 1.2 | 1.2 | 1.2 |
| Parts boric acid | 0 | 1.5 | 0.5 | 0.5 |
| Parts ethyltriethoxysilane | 0 | 0 | 3.6 | 1.2 |
| Parts OH endblocked dimethylpolysiloxane oil [2] | 0 | 0 | 12 | 12 |

[1] Dichlorobenzoyl peroxide.
[2] Refers to hydroxy endblocked dimethylpolysiloxane oil having an average of one hydroxy grouping per silicon atom and having a hydroxy group content of from 2.5 to 3.2 percent by weight.

The above formulations were mold-cured for a period of fifteen minutes at 250° F. and postcured for a period of twenty-four hours at a temperature of 480° F. Physical properties of each of the cured specimens were determined and appear in the table which follows.

TABLE 2-2

| Recipe | Hardness (Shore A) | Tensile strength (p.s.i.) | Elongation (percent) | Tear resistance, lb./in. | Percent permanent set |
|---|---|---|---|---|---|
| G-1 | 76 | 915 | 200 | 75 | 0 |
| H-1 | 66 | 800 | 260 | 69 | 10 |
| I-1 | 64 | 775 | 270 | 110 | 10 |
| J-1 | 66 | 1,060 | 310 | 105 | 5 |

The addition of small amounts of ferric oxide as, for example, from 1 to 4 or 5 parts per 100 parts of the polysiloxane gum (preferably 2 parts) serves to stabilize the organopolysiloxane compounds during curing and heat-aging procedures. By so doing, less difficulty is encountered in the curing steps. By way of illustration, 2 parts by weight of ferric oxide were compounded with recipes I-1 and J-1 and the new formulations cured, postcured and tested for physical properties as described above. The data obtained appears below.

TABLE 2-3

| Recipe | Hardness (Shore A) | Tensile strength (p.s.i.) | Elongation (percent) | Tear resistance, lb./in. | Percent permanent set |
|---|---|---|---|---|---|
| I-1 | 62 | 885 | 370 | 100 | 20 |
| J-1 | 63 | 950 | 300 | 101 | 10 |

The ruptured dumbbell shaped specimens employed in the tensile strength determinations (see Table 2–2) were then placed in overlapping fashion (with the wider portions thereof superimposed to an extent of at least one-half inch) and pressed together by a force exerted by the thumb and forefinger of the technician to determine whether the elastomers of each of the formulations were pressure-sensitive adhesive materials. The ruptured portions of the specimen prepared from recipe G-1 exhibited no tendency to adhere to each other. The ruptured portions of the specimen prepared from recipe H-1 exhibited little or no tendency to adhere to each other while the ruptured portions of specimens prepared from recipes I-1 and J-1 exhibited a strong tendency to adhere to each other. More specifically, when the narrow ends of the superimposed portions of the specimens prepared from recipes I-1 and J-1 were placed in the jaws of a conventional tensile testing apparatus (a Scott Testing Apparatus) forces ranging from 7 to 18 pounds were required to either pull or separate the superimposed portions apart. On the other hand, the superimposed portions prepared from recipe G-1 did not, as indicated above, exhibit any tendency to adhere while the superimposed portions prepared from recipe H-1 did not adhere to an extent sufficient to obtain a reading on the testing apparatus. Recipes I-1 and J-1 both ferric oxide modified and unmodified displayed excellent pressure-sensitive adhesive characteristics. Shear adhesion values for these elastomers as measured on a Scott Tester were between 10 and 17 pounds.

*Example 3*

A hydroxy endblocked dimethyldiphenylpolysiloxane oil containing an average of one hydroxy group bonded to each of the terminal silicon atoms of the polysiloxane chains thereof was prepared by a technique similar to that described in the preparation of hydroxy endblocked dimethylpolysiloxane oils as described in Example 1. However, this fluid contains an average of 27.2 weight percent diphenylsiloxane units, and has an average hydroxy content of approximately 2.75 percent and an average molecular weight of 1130.

Starting with the polysiloxane gum prepared in Example 1 above, the following formulations were prepared and recorded in Table 3-1.

TABLE 3-1

| | Recipe | |
|---|---|---|
| | K-1 | L-1 |
| Parts polysiloxane gum | 100 | 100 |
| Parts filler, Cab-O-Sil | 40 | 40 |
| Parts catalyst [1] | 1.2 | 1.2 |
| Parts boric acid | 0.5 | 0.5 |
| Parts ethyltriethoxysilane | 1.0 | 0 |
| Parts diphenyldiethoxysilane | 0 | 1.0 |
| Parts hydroxy endblocked dimethyldiphenylpolysiloxane oil [2] | 12 | 12 |

[1] Di-tertiary-butyl peroxide.
[2] A hydroxy endblocked dimethyldiphenylpolysiloxane oil having an average of one hydroxyl group per terminal silicon atom and having a hydroxy group content of approximately 2.75 percent.

The above formulations were mold-cured for a period of twenty minutes at 340° F. and postcured for a period of twenty-four hours at a temperature of 480° F. Physical properties of each of the cured specimens are determined and appear in the table which follows.

TABLE 3-2

| Recipe | Hardness (Shore A) | Tensile strength (p.s.i.) | Elongation (percent) | Tear resistance, lb./in. | Percent permanent set |
|---|---|---|---|---|---|
| K-1 | 58 | 785 | 340 | 83 | 10 |
| L-1 | 58 | 710 | 350 | 95 | 10 |

The above specimens when tested for adhesive pressure-sensitive properties by the shear adhesion test in a Scott Tester exhibited adhesive properties expressed in pounds from 12.0 to 17.5. The formulations were, by the above process, molded into thin sheets (approximately 0.025 inch) having width and length of 15 inches. Sheets were cut into tapes of 1 inch in width and the tapes subsequently wound in overlapping fashion, under tension, about a mandrel. The applied tapes did not slip from the mandrel and did not require any external force to hold them in place. Upon standing it appeared that the organopolysiloxane elastomer tapes flowed to some extent tightening about the mandrel. Upon heating the tapes positioned about the various mandrels to temperatures of 350° F., 450° F. and 480° F. for a period of from six to twenty-four hours, the overlapping portions of the organopolysiloxane tape fused to an essentially homogeneous mass. An attempt to remove the tape from the mandrels without damage thereto was unsuccessful.

A specimen of the prepared tapes which had not been wound upon a mandrel but which had been merely subjected to the heat treatment described above were found to be flexible and pressure-sensitive adhesive materials.

*Example 4*

To 100 parts of polysiloxane gum identical to that employed in Example 1 was added 32 parts reinforcing filler (Cab-O-Sil), 4 parts Superfloss, 1 part barium zirconate, 10 parts of ethoxy endblocked dimethylsiloxane oil, and 3 parts ferric oxide by conventional milling technique on a two-roll mill. This formulation will be referred to as recipe M-1. To this formulation was added various ingredients on the same two-roll mill to give the following formulations as described in Table 4-1 below.

TABLE 4-1

| Recipe | Part compound M-1 | Parts bis-hydroxy dimethylsilylbenzene [1] | Parts diphenyldiethoxysilane | Parts boric acid | Parts dichlorobenzoyl peroxide |
|---|---|---|---|---|---|
| N-1 | 150 | 1.0 | 1.0 | 0 | 1.2 |
| O-1 | 150 | 1.0 | 0 | 0.5 | 1.2 |
| P-1 | 150 | 1.0 | 1.0 | 0.5 | 1.2 |

[1] Structure:

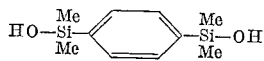

The catalyzed formulations were mold-cured into thin sections by heating to a temperature of 250° F. for a period of fifteen minutes and postcured for a period of twenty-four hours at a temperature of 480° F. ASTM slabs cured by this identical described procedure were subsequently tested for their physical properties. The range of properties which characterize the elastomers appears below.

TABLE 4-2

| Recipe | Hardness (Shore A) | Tensile strength (p.s.i.) | Elongation (percent) | Tear resistance, lb./in. | Shear adhesion, (lb.) |
|---|---|---|---|---|---|
| N-1 | 30 | 705 | 450 | 72 | 0 |
| O-1 | 50 | 690 | 300 | 75 | [1] 10-15 |
| P-1 | 50 | 820 | 380 | 90 | [1] 10-15 |

[1] Excellent.

The thin sheets from formulations O-1 and P-1 were cut into tapes one inch in width and the tapes subsequently wound in an overlapping fashion under tension about a mandrel. The applied tapes did not slip from the mandrel and did not require any external force to hold them in place. Upon standing, it appeared that the organopolysiloxane elastomer tapes flowed to some extent tightening about the mandrel. On heating the tapes positioned about the various mandrels at temperatures 350° F., 450° F. and 480° F. for a period of six to twenty-four hours the overlapping portions of the organopolysiloxane tape fused to an essentially homogeneous mass. An attempt to remove the tapes from the mandrels without damage thereto was unsuccessful. The specimens of the prepared tapes which had not been wound upon a mandrel but which had been merely subjected to the heating treatment described above were found to be flexible and to be pressure-sensitive adhesive materials.

*Example 5*

To 100 parts polysiloxane gum as described in Example 1 was added 32 parts of reinforcing filler (Cab-O-Sil), 4 parts Superfloss, 1 part barium zirconate, 3 parts ferric oxide, by conventional milling on a two-roll mill. This base compound is referred to as recipe W-1. To this mixture was added 12 parts of ethoxy endblocked dimethylpolysiloxane having an ethoxy content of 12 to 15 weight percent, 1 part of diphenylsilane diol, 0.5 part boric acid, and 1 part of dichlorobenzoyl peroxide. The compound was cured for fifteen minutes at 250° F. and postcured for twenty-four hours at 480° F. The physical properties of this postcured elastomer were hardness (Shore A), 46; tensile strength, 815 p.s.i.; elongation, 435 percent; tear resistance, 67 pounds per inch; permanent set, 20 percent; shear adhesion value, 15 pounds.

This elastomer exhibited pressure-sensitive adhesive properties both in the mold-cured and postcured states. These sheets prepared from this formulation by the curing techniques described above were cut into one inch width tapes and wrapped in an overlapping fashion under tension around a mandrel. The tapes did not slip while being applied under tension. On heating the mandrels so wrapped at temperatures 400° F., 450° F. and 480° F. for periods of from six to twenty-four hours the tapes were found to fuse into an essentially homogeneous mass.

*Example 6*

To 100 parts of polysiloxane gum aa described in Example 1 was added 40 parts of reinforcing Cab-O-Sil, 4½ parts of ethoxy endblocked fluid containing an ethoxy content of between 12 to 15 percent, and 4.5 parts of hydroxy endblocked dimethylpolysiloxane oil having a hydroxy group content of 3.2 percent, and 2 parts of ferric oxide on a conventional two-roll mill. This was referred to as recipe Q-1. To 100 parts of compound Q-1 was added 0.5 part of diphenyldiethoxysilane, 0.5 part of diphenylsilane diol, 0.5 part of boric acid, and catalyzed with 1.2 parts of dichlorobenzoyl peroxide. This was referred to as compound R-1. Both Q-1 and R-1 were mold-cured for fifteen minutes at 250° F. and postcured at 480° F. for twenty-four hours. The physical properties of the resulting elastomers are recorded in Table 6-1 below.

TABLE 6-1

| Recipe | Hardness (Shore A) | Tensile strength (p.s.i.) | Elongation (percent) | Tear Resistance, lb./in. | Permanent set (percent) | Shear adhesion (lb.) |
|---|---|---|---|---|---|---|
| Q-1 | 50 | 1,010 | 495 | 65 | 0 | 0 |
| R-1 | 30 | 735 | 650 | 69 | 30 | [1] 15 |

[1] Excellent.

The resultant elastomer prepared from formulation R-1 exhibited excellent pressure-sensitive adhesive properties. Tapes prepared from thin sections of this material were wrapped in an overlapping fashion under tension around mandrels and this was done so without any slipping on behalf of these tapes. The thus wrapped mandrels were subjected to temperatures of 350° F., 450° F. and 480° F. for periods of time from six to twenty-four hours and the result was an essentially fused homogeneous mass. This fusion on heating is a valuable property which can find great utility in the electrical industry in reference to electrical insulation and wrapping of cables and preparation of ducting materials.

*Example 7*

Starting with a polysiloxane gum consisting of dimethylpolysiloxane units (87.65 percent by weight), ethylvinylsiloxane units (0.35 percent by weight) and diphenylsiloxane units (12 percent by weight), a recipe was prepared containing 100 parts of the gum, 15 parts of reinforcing silica, Cab-O-Sil, 20 parts of reinforcing silica, HiSil, 4.5 parts of an ethoxy endblocked dimethylpolysiloxane oil containing approxmiately 12 to 15 weight percent ethoxy content, 4.5 parts of a hydroxy endblocked dimethylpolysiloxane oil containing a hydroxy group content of approximately 3 percent, and 2 parts of ferric oxide by a milling procedure. This formulation was referred to as recipe S-1. To 100 parts of recipe S-1 was added by a conventional milling technique 0.5 part of diphenyldiethoxysilane, 0.5 part of diphenylsilane diol, 0.5 part of boric acid, 1.2 parts of dichlorobenzoyl peroxide. This formulation was referred to as recipe T-1. Compounds S-1 and T-1 were mold-cured for a period of fifteen minutes at 250° F. and postcured for twenty-four hours at 480° F. The resultant elastomers T-1 exhibited a highly pressure-sensitive adhesive surface while S-1 did not exhibit this property at all. The elastomers were checked for the physical properties and these are recorded below in Table 7-1.

TABLE 7-1

| Recipe | Hardness (Shore A) | Tensile strength (p.s.i.) | Elongation (percent) | Tear Resistance, lb./in. | Permanent set (percent) | Shear adhesion (lb.) |
|---|---|---|---|---|---|---|
| S-1 | 45 | 788 | 500 | 60 | 0 | 0 |
| T-1 | 53 | 865 | 370 | 62 | 25 | [1] 15 |

[1] Excellent.

The tapes prepared from recipe T-1 by procedures previously described above were wrapped around mandrels in an overlapping fashion under tension and did not slip from each other's surface due to the tension under which they were being wrapped and on heating these wrapped mandrels at temperatures of 350° F., 450° F. and 480° F. The tapes fused into an essentially homogeneous mass. These tapes show excellent adhesive pressure-sensitive properties both moldcured and postcured. In addition the heating of these materials results in fusion of the materials to give homogeneous compositions which can be readily utilized in the electrical industry for many applications.

*Example 8*

Starting with the polysilane gum prepared in Example 1 above consisting of dimethylsiloxane units and ethylvinylsiloxane units, an unmodified organopolysiloxane compound was prepared by adding thereto in the compounding procedure conducted on a two-roll mill, a finely-divided silica filler, Cab-O-Sil. The following modifications with this base compound were prepared and recorded in Table 8–1 shown below.

TABLE 8-1

| Recipe No. | Parts polysiloxane gum | Parts filler | Parts catalyst [1] | Parts boric acid | Parts diphenylsilane diol | Parts hydroxy end-blocked dimethyl-polysiloxane oil [2] |
|---|---|---|---|---|---|---|
| A-2 | 100 | 37 | 1.2 | 0 | 0 | 0 |
| B-2 | 100 | 40 | 1.2 | 0 | 0 | 12 |
| C-2 | 100 | 40 | 1.2 | 0 | 1.0 | 0 |
| D-2 | 100 | 40 | 1.2 | 0.5 | 0 | 0 |
| E-2 | 100 | 40 | 1.2 | 0.5 | 1.0 | 0 |
| F-2 | 100 | 40 | 1.2 | 0.5 | 0 | 12 |
| G-2 | 100 | 40 | 1.2 | 0.5 | 1.0 | 12 |

[1] Dichlorobenzoyl peroxide.
[2] Hydroxy endblocked dimethylpolysiloxane oil having an average of one hydroxy group per terminal silicon atom and having hydroxy group content of from 2.5 to 3.2 percent by weight.

The above formulations were mold-cured for a period of fifteen minutes at a temperature of 250° F.; postcured for a period of twenty-four hours at a temperature of 480° F. Physical properties of each of the cured specimens were determined as follows:

TABLE 8-2

| Recipe | Hardness (Shore A) | Tensile strength (p.s.i.) | Elongation (percent) | Tear resistance, lb./in. | Percent permanent set |
|---|---|---|---|---|---|
| A-2 | 76 | 915 | 200 | 75 | 0 |
| B-2 | 68 | 900 | 330 | 90 | 0 |
| C-2 | 74 | 850 | 200 | 68 | 0 |
| D-2 | 68 | 850 | 250 | 70 | 10 |
| E-2 | 65 | 880 | 290 | 98 | 10 |
| F-2 | 60 | 900 | 300 | 102 | 10 |
| G-2 [1] | 63 | 700 | 375 | 69 | 20 |

[1] This particular elastomer exhibited excellent pressure-sensitive adhesive properties.

The ruptured dumbbell shaped specimens employed in the tensile strength determinations (see Table 8–2) were then placed in overlapping fashion (with the wider portions thereof superimposed to an extent of at least one-half inch) and pressed together by a force exerted by the thumb and forefinger of the technician to determine whether the elastomers of each of the formulations were pressure-sensitive adhesive materials. The ruptured portions of specimens prepared from recipes A–2 through C–2 exhibited no tendency to adhere to each other. The ruptured portions of specimens prepared from recipe D–2 exhibited little or no tendency to adhere to each other, while the ruptured portions of specimens prepared from recipes E–2 through G–2 exhibited a strong tendency to adhere to each other. More specifically, when the narrow ends of the superimposed portions of the specimens prepared from recipes E–2 through G–2 were placed in the jaws of a conventional tensile testing apparatus (a Scott Testing Apparatus) forces ranging from 7 to 18 pounds were required to either pull or separate the superimposed portions apart. On the other hand, the superimposed portions prepared from recipes A–2 through C–3 did not, as indicated above, exhibit any tendency to adhere while the superimposed portions prepared from recipe D–2 did not adhere to an extent sufficient to obtain a reading on the testing apparatus.

*Example 9*

To 100 parts of polysiloxane gum identical to that described in Example 1 was added 32 parts of finely-divided silica, Cab-O-Sil, 1 part barium zirconate, 4 parts of Superfloss, 3 parts ferric oxide, 12 parts hydroxy end-blocked dimethylpolysiloxane fluid referred to as H–2 compound. To compound H–2 was added 1 part diphenylsilane diol plus 0.5 part boric acid, and 1.2 parts dichlorobenzoyl peroxide, by compounding procedure on a two-roll mill. The formulation was referred to as I–2. Both formulations H–2 and I–2 were mold-cured by heating to a temperature of 250° F. for fifteen minutes. The cured elastomers were then subjected to a postcure for a period of twenty-four hours at a temperature of 480° F. The physical properties for the postcured elastomers are tabulated in Table 9–1 below.

TABLE 9-1

| Recipe | Hardness (Shore A) | Tensile strength (p.s.i.) | Elongation (percent) | Tear resistance, lb./in. | Permanent set (percent) | Shear adhesion (lb.) [1] |
|---|---|---|---|---|---|---|
| H-2 | 48 | 925 | 410 | 68 | 0 | 0 |
| I-2 | 55 | 935 | 320 | 75 | 20 | [2] 10-17 |

[1] Shear adhesion was determined by pressing together two tensile dumbbells which had been broken. The wide sections of the dumbbells were pressed together by fingers in such a manner that there was a ¾-inch overlap. The specimen was then placed in a Scott tensile tester and pulled apart by a shear type of action. The separation or breaking of the dumbbells prior to separation was recorded in pounds.
[2] Excellent.

The formulation I–2 above was, by the above process, molded into a thin sheet (approximately 0.025 inch) having a width and length of fifteen inches. The sheet was then cut into tapes of one inch in width and the tapes subsequently wound in an overlapping fashion under tension about a mandrel. The applied tapes did not slip from the mandrel and did not require any external force to hold them in place. Upon standing it appeared that the organopolysiloxane elastomer tapes flowed to some extent tightening about the mandrel. Upon heating the tapes positioned about the various mandrels to temperatures of 350° F., 450° F. and 480° F. for a period of six to twenty-four hours, the overlapping portions of the polysiloxane tape fused to an essentially homogeneous mass. An attempt to remove the tape from the mandrels without damage thereto was unsuccessful. A specimen of the prepared tape which had not been wound upon a mandrel but which had merely been subjected to the treatment described above was found to be flexible and a pressure-sensitive adhesive material.

*Example 10*

Starting with a polysiloxane gum consisting of dimethylsiloxane units 87.65 percent by weight, ethylvinyl siloxane units, 0.35 percent by weight, and diphenylsiloxane units, 12 percent by weight, recipe J–2 was prepared containing 100 parts of the gum, 15 parts of a reinforcing silica, Cab-O-Sil, and 20 parts of another reinforcing silica HiSil, 12 parts of a hydroxy endblocked polydimethylsiloxane oil (containing hydroxy groups in an amount by weight of 3 percent and having an average of one hydroxy group per terminal silicon atom), 2 parts of ferric oxide, and 1.2 parts of dichlorobenzoyl peroxide, by a milling procedure. To compound J–2 was added 1 part of diphenylsilane diol and 0.5 part boric acid and 1.2 parts of dichlorobenzoyl peroxide by conventional milling technique to give recipe K–2. The catalyzed compounds J–2 and K–2 were mold-cured by heating at a temperature of 250° F. for a period of fifteen minutes. The cured elastomer was then postcured for a period of twenty-four hours at a temperature of 480° F. The physical properties of the postcured elastomers are recorded in Table 10–1 below.

TABLE 10-1

| Recipe | Hardness (Shore A) | Tensile strength (p.s.i.) | Elongation (percent) | Tear resistance, lb./in. | Permanent set (percent) | Shear adhesion (lb.) |
|---|---|---|---|---|---|---|
| J-2 | 43 | 805 | 475 | 60 | 20 | 0 |
| K-2 | 56 | 895 | 360 | 70 | 10 | [1] 15-20 |

[1] Excellent.

The formulation K-2 was, by the above process, molded into a thin sheet (approximately 0.025 inch) having a width and length of 15 inches. The sheet was then cut into tapes of 1 inch in width and the tapes subsequently wound in an overlapping fashion, under tension, about a mandrel. The applied tapes did not slip from the mandrel and did not require any external force to hold them in place. Upon standing, it appeared that the organopolysiloxane elastomer tapes flowed to some extent tightening about the mandrel. On heating the tapes positioned about the various mandrels to temperatures of 350° F., 450° F. and 480° F., for a period of six to twenty-four hours. The overlapping portions of the organopolysiloxane tape fused to an essentially homogeneous mass. An attempt to remove the tape from the mandrels without damage thereto was unsuccessful. A specimen of a prepared tape which had not been wound about a mandrel but which had been merely subjected to the heating treatment described above was found to be flexible and a pressure-sensitive adhesive material. Both mold-cured and postcured tapes exhibited excellent pressure-sensitive properties. In addition, these tapes find utility for uses at low temperatures.

*Example 11*

To each of two 100-part portions a polysiloxane gum (identical with that described in Example 1) was compounded 45 parts of acetylene black, 8 parts of a reinforcing silica (Cab-O-Sil), and 5 parts of boric acid. The newly formed compositions were compounded with either a hydroxy-containing dimethylpolysiloxane oil or diphenylsilane diol, or both. The formulations appear below.

TABLE 11-1

| Recipe | Parts diphenylsilane diol | Parts hydroxy endblocked dimethylpolysiloxane oil [1] |
|---|---|---|
| L-2 | 1.0 | 0 |
| M-2 | 1.0 | 6 |

[1] Containing an average of one hydroxy group per terminal silicon atom in the molecule with the hydroxy group being present in an amount by weight of 3 percent.

To each of the above recipes was added 1.2 parts dibutyl peroxide by compounding technique conducted on a two-roll mill. The catalyzed formulations were mold-cured into thin sections by heating to a temperature of 340° F. for a period of twenty minutes. Cured elastomers were then subjected to a postcuring treatment for a period of twenty-four hours at a temperature of 480° F. and subsequently tested for their physical properties. The ranges of properties which characterize the elastomers appear below.

TABLE 11-2

| Recipe | Hardness (Shore A) | Tensile strength (p.s.i.) | Elongation (percent) | Tear resistance, lb/in. |
|---|---|---|---|---|
| L-2 and M-2 | 70-74 | 700-750 | 170-200 | 100-130 |

All of the elastomers were pressure-sensitive adhesive materials. When subjected to the test described in Example 8, for determining their adhesive characteristics, it was found that a force of from 10 to 17 pounds was required to pull the superimposed specimens apart. Carbon black filled organopolysiloxane elastomers prepared from formulations identical to those of recipes L-2 and M-2 but free of a boron-containing material and a hydroxy-containing polysiloxane material are not pressure-sensitive adhesive materials. More specifically, they exhibit no tendency to adhere to each other. In addition, it is also noted that the pressure-sensitive organopolysiloxane elastomers of the above formulations possess markedly improved tear resistance properties as compared to carbon black filled organopolysiloxane elastomers outside of my invention. Organopolysiloxane tapes prepared from recipes L-2 and M-2 were fused into an essentially homogeneous mass upon heating whereas tapes prepared from the same formulation but free of boric acid and the hydroxy-containing polysiloxane material could not be fused together upon heating.

*Example 12*

Starting with the polysiloxane gum prepared in Example 1 above consisting of dimethylsiloxane units and ethylvinylsiloxane units, an unmodified polysiloxane compound was prepared by adding thereto, in a compounding procedure, conducted on a two-roll mill, a finely-divided silica filler (Cab-O-Sil). The resulting unmodified compound was subsequently divided into sixteen portions. To one portion was added 1.2 parts by weight of di-tertiary-butyl peroxide, to another was added the same amount of the catalyst and 12 parts by weight of an ethoxy endblocked dimethylpolysiloxane oil prepared above, to another was added the same amount of catalyst and 3.6 parts by weight of ethyltriethoxysilane and to another the same amount of catalyst and 3 parts by weight of boric acid. To the remaining portions were added an alkoxy-containing silicon material and a boron-containing material in varying amounts. The recipes for the various formulations are listed below.

TABLE 12-1

| Recipe No. | Parts polysiloxane gum | Parts filler | Parts catalyst | Parts boric acid | Parts ethyltriethoxysilane | Parts ethoxy endblocked dimethylpolysiloxane oil |
|---|---|---|---|---|---|---|
| A-3 | 100 | 40 | 1.2 | 0.0 | 0.0 | 0.0 |
| B-3 | 100 | 40 | 1.2 | 0.0 | 0.0 | [1] 12 |
| C-3 | 100 | 40 | 1.2 | 0.0 | 3.6 | 0.0 |
| D-3 | 100 | 40 | 1.2 | 1.5 | 0.0 | 0.0 |
| E-3 | 100 | 40 | 1.2 | 0.5 | 1.2 | 0.0 |
| F-3 | 100 | 40 | 1.2 | 0.5 | 0.0 | [1] 8.0 |
| G-3 | 100 | 40 | 1.2 | 0.5 | 3.6 | [1] 12.0 |
| H-3 | 100 | 40 | 1.2 | 0.5 | 1.2 | [1] 12.0 |
| I-3 | 100 | 40 | 1.2 | 0.5 | 6.0 | [1] 12.0 |
| J-3 | 100 | 40 | 1.2 | 1.0 | 3.6 | [1] 12.0 |
| K-3 | 100 | 40 | 1.2 | 1.0 | 1.2 | [1] 12.0 |
| L-3 | 100 | 40 | 1.2 | 0.75 | 3.6 | [1] 6.0 |
| M-3 | 100 | 40 | 1.2 | 0.5 | 1.2 | [1] 6.0 |
| N-3 | 100 | 40 | 1.2 | 0.25 | 3.6 | [2] 12 |
| O-3 | 100 | 40 | 1.2 | 1.0 | 6.0 | [2] 12 |
| P-3 | 100 | 40 | 1.2 | 0.75 | 3.6 | [2] 12 |

[1] An ethoxy endblocked dimethylpolysiloxane oil having an average of one ethoxy group per terminal silicon atom and having an ethoxy group content of from 12 to 15 percent by weight.
[2] An ethoxy endblocked dimethylpolysiloxane oil having an average of 1.5 ethoxy groups per terminal silicon atom and having an ethoxy group content of from 12 to 15 percent by weight.

The above formulations were mold-cured for a period of twenty minutes at a temperature of 340° F. and postcured for a period of twenty-four hours at a temperature of 480° F. The physical properties of each of the cured specimens were determined and appear in the table which follows.

TABLE 12-2

| Recipe | Hardness (Shore A) | Tensile strength (p.s.i.) | Elongation (percent) | Tear resistance, lb./in. | Percent permanent set |
|---|---|---|---|---|---|
| A-3 | 76 | 915 | 200 | 75 | 0 |
| B-3 | 68 | 910 | 340 | 90 | 0 |
| C-3 | 75 | 850 | 210 | 71 | 0 |
| D-3 | 68 | 800 | 250 | 70 | 10 |
| E-3 | 65 | 875 | 300 | 100 | 10 |
| F-3 | 60 | 900 | 310 | 105 | 10 |
| G-3 | 68 | 710 | 300 | 118 | 25 |
| H-3 | 71 | 1,000 | 350 | 113 | 20 |
| I-3 | 70 | 705 | 200 | 121 | 5 |
| J-3 [1] | 71 | 585 | 435 | 87 | 50 |
| K-3 [1] | 70 | 490 | 245 | 62 | 35 |
| L-3 | 68 | 820 | 375 | 109 | 20 |
| M-3 | 66 | 1,050 | 430 | 150 | 20 |
| N-3 | 62 | 735 | 300 | 116 | 10 |
| O-3 [1] | 72 | 620 | 185 | 113 | ---- |
| P-3 | 59 | 860 | 310 | 107 | 15 |

[1] Occluded gases in specimens.

The addition of small amounts of ferric oxide as for example from about 1 part to 4 or 5 parts per 100 parts of the polysiloxane gum serves to stabilize the polysiloxane compounds during curing and heat-aging procedures. By so doing less difficulty is encountered in the curing steps. By way of illustration three parts by weight of ferric oxide were compounded with recipes H-3, I-3, J-3 and K-3 and the new formulations cured, postcured and tested for physical properties as described above. The data obtained appears in the table below.

TABLE 12-3

| Recipe [1] | Hardness (Shore A) | Tensile strength (p.s.i.) | Elongation (percent) | Tear resistance, lb./in. | Percent permanent set |
|---|---|---|---|---|---|
| H-3 | 73 | 1,000 | 345 | 118 | 20 |
| I-3 | 73 | 800 | 300 | 109 | 10 |
| J-3 | 70 | 865 | 330 | 112 | 15 |
| K-3 | 75 | 800 | 360 | 100 | 40 |

[1] Containing three parts by weight of ferric oxide.

The ruptured dumbbell shaped specimens employed in the tensile strength determinations (see Table 12-2) were then placed in overlapping fashion (with the wider portions thereof superimposed to an extent of at least one-half inch) and pressed together by a force exerted by the thumb and forefinger of the technician to determine whether the elastomers of each of the formulations were pressure-sensitive adhesive materials. The ruptured portions of specimens prepared from recipes A-3 through C-3 exhibited no tendency to adhere to each other. The ruptured portions of specimens prepared from recipe D-3 exhibited little or no tendency to adhere to each other while the ruptured portions of specimens prepared from recipes E-3 through P-3 exhibited a strong tendency to adhere to each other. More specifically, when the narrow ends of the superimposed portions of the specimens prepared from recipes E-3 through P-3 were placed in the jaws of a conventional tensile apparatus (a Scott Testing Apparatus) forces ranging from 7 to 18 pounds were required to either pull or separate the super-imposed portions apart. On the other hand, the superimposed portions prepared from recipes A-3 through C-3 did not, as indicated above, exhibit any tendency to adhere while the superimposed portions prepared from recipe D-3 did not adhere to an extent sufficient to obtain a reading on the testing apparatus.

*Example 13*

To a polysiloxane gum (identical with that employed and described in Example 1) was added finely-divided silica in an amount sufficient to provide 40 parts of filler per 100 parts of gum. The mixture was divided into thirteen portions and to each of the portions was added a boron-containing material and an alkoxy-containing silicon material in the form of an alkoxysilane or an alkoxy-containing polysiloxane or both. The formulations appear in the table below.

TABLE 13-1

[Parts of additives per 100 parts gum and 40 parts finely-divided silica (Cab-O-Sil)]

| Recipe | Boron-containing compound | Ethyl-triethoxy-silane | Ethoxy-containing polysiloxane [1] |
|---|---|---|---|
| 1 | 0.5 part 2,6-di-tert-butyl-p-cresyl-diallyl borate. | 0 | 12 |
| 2 | ----do---- | 1 | 0 |
| 3 | ----do---- | 1 | 12 |
| 4 | 5.0 parts 2,6-di-tert-butyl-p-cresyl-diallyl borate. | 1 | 12 |
| 5 | 0.5 part 2,6-di-tert-butyl-p-cresyl-di-2-ethylhexyl borate. | 1 | 12 |
| 6 | 5.0 parts 2,6-di-tert-butyl-p-cresyl-di-2-ethylhexyl borate. | 1 | 12 |
| 7 | 0.5 part 2,6-di-tert-butyl-p-cresyl-di-n-butyl borate. | 1 | 12 |
| 8 | 5.0 parts 2,6-di-tert-butyl-p-cresyl-di-n-butyl borate. | 1 | 12 |
| 9 | 0.5 part tri-n-butyl borate | 1 | 12 |
| 10 | 0.5 part amyl borate | 1 | 12 |
| 11 | 0.5 part boric anhydride | 1 | 12 |
| 12 | 0.5 part anhydrous sodium borate | 1 | 12 |
| 13 | 0.5 part tri-o-cresyl borate | 1 | 12 |

[1] An ethoxy endblocked dimethylpolysiloxane oil having an average of one ethoxy group per terminal silicon atom and in which the percent by weight of the ethoxy group is from 10 to 12 percent.

To each of recipes 1, 3, 5 and 7 through 13 was added by a milling procedure 1.5 parts by weight of di-tertiary-butyl peroxide, while to each of recipes 2, 4 and 6 was added 1.5 parts of dichlorobenzoyl peroxide by a similar procedure. The recipes catalyzed with di-tertiary-butyl peroxide were mold-cured by heating at a temperature of 340° F. for a period of twenty minutes, while the recipes catalyzed with di-chlorobenzoyl peroxide were mold-cured by heating at a temperature of 250° F. for a period of fifteen minutes. A portion of the specimens prepared from each of the recipes were tested for physical properties, while the remaining specimenss were tested after being postcured for a period of twenty-four hours at a temperature of 480° F. The ranges of values obtained for mold-cured and postcured specimens of all of the recipes appear below.

RANGES OF PHYSICAL PROPERTIES

| | Hardness (Shore A) | Tensile strength, p.s.i. | Elongation (percent) | Permanent set (percent) | Tear resistance, lb./in. |
|---|---|---|---|---|---|
| Mold-cured | 40-55 | 1,050-1,200 | 400-600 | 0-10 | ---- |
| Postcured | 45-55 | 800-1,050 | 300-400 | 0-15 | 80-110 |

In those recipes wherein five parts of the boron-containing material were employed occlusions were noted in the cured specimens. Specimens obtained during the tensile strength determinations of each of the recipes were tested for their pressure-sensitive adhesive characteristics by the procedure described in Example 12. It should be noted that the specimens required for tensile strength determinations are dumbbell shaped and have a width at their wider portions of about one inch. When ruptured specimens are pressed together as is called for in my adhesive strength test, the wider portions are superimposed and have a contacting rectangular area of about one inch by 1½ inches.

All of the cured and postcured specimens of the recipes were pressure-sensitive adhesive materials. The pulling force required to separate the pressed-together ruptured specimens varied from 5 to 15 pounds.

Polysiloxane elastomers prepared from formulations free of alkoxy-containing silicon material and a boron-containing material, but otherwise similar in all respects to the elastomers prepared above, were found to be adhesive in nature and exhibited no tendency to adhere to each other.

Example 14

To a polysiloxane gum identical with that employed and described in Example 12 was added finely-divided silica in an amount sufficient to provide 40 parts of filler per 100 parts of gum. The mixture was divided into sixteen portions and to each of the portions was added 0.5 part of boric acid and various alkoxy-containing silicon materials in the form of either an alkoxysilane or an alkoxy-containing polysiloxane oil (containing ethoxy groups in an amount of about 12 percent by weight) or both. The formulations appear in the table below.

TABLE 14-1

[Parts of additives per 100 parts gum, 0.5 part boric acid and 40 parts finely-divided silica (Cab-O-Sil)]

| Recipe | Alkoxy-containing compound |
| --- | --- |
| 20 | 1.2 gamma-carbethoxypropyltriethoxysilane. |
| 21 | Do. 12 ethoxy-containing dimethylpolysiloxane oil. |
| 22 | 1.2 phenyltriethoxysilane. 12 ethoxy-containing dimethylpolysiloxane oil. |
| 23 | 1.2 beta-carbethoxypropylmethyldiethoxysilane. 12 ethoxy-containing dimethylpolysiloxane oil. |
| 24 | 1.2 allyltriethoxysilane. 12 ethoxy-containing dimethylpolysiloxane oil. |
| 25 | 1.2 beta-crabethoxypropyltriethoxysilane. 12 ethoxy-containing dimethylpolysiloxane oil. |
| 26 | 1.2 gamma, chloropropylmethyldiethoxysilane. |
| 27 | Do. 12 Ethoxy-containing dimethylpolysiloxane oil. |
| 28 | 1.2 di-phenyldiethoxysilane. 12 ethoxy-containing dimethylpolysiloxane oil. |
| 29 | 1.2 partially hydrolyzed and condensed tetra-ethyl silicate. 12 ethoxy-containing dimethylpolysiloxane oil. |
| 30 | 1.2 di-ethoxydi(2-ethylhexanediol-1,31)silicate. 12 ethoxy-containing dimethylpolysiloxane oil. |
| 31 | 1.2 diethoxy-di-(triethanolamine)silicate-N,N-dioleate. 12 ethoxy-containing dimethylpolysiloxane oil. |
| 32 | 1.2 diethoxy-O,O-di-(2-ethylhexanediol-1,3)-silicate. 12 ethoxy-containing dimethylpolysiloxane oil. |
| 33 | 1.2 diethoxy-O,O-di-(triethanolamine)silicate-N,N-dioleate. 12 ethoxy-containing dimethylpolysiloxane oil. |
| 34 | 1.2 diethoxy-O,O-di-(triethanolamine)silicate. 12 ethoxy-containing dimethylpolysiloxane oil. |
| 35 | 1.2 diethoxy-O,O-di-(triethanolamine)silicate-N,N-dioleate. |

To each of the recipes was added 1.2 parts of a mixture comprising 40 percent by weight of 2,4 dichlorobenzoyl peroxide dispersed in 60 percent by weight of a dimethylpolysiloxane oil. The addition of the catalyst was effected on a two-roll mill. The catalyzed recipes were mold-cured by heating to a temperature of 250° F. for a period of about fifteen minutes. A portion of the cured specimens prepared from each of the recipes were tested for physical properties while the remaining specimens were tested for the same properties after being subjected to a postcure treatment for a period of twenty-four hours at a temperature of 480° F. The ranges of values obtained for mold-cured and postcured specimens of all the recipes appear below.

|  | Hardness (Shore A) | Tensile strength, p.s.i | Elongation (percent) | Permanent set (percent) | Tear resistance, lb./in. |
| --- | --- | --- | --- | --- | --- |
| Mold-cured | 32–45 | 700–1,150 | 325–600 | 0–15 | |
| Postcured | 50–65 | 700–1,000 | 250–375 | 0–20 | 85–115 |

All of the cured as well as the postcured elastomers prepared from the above recipe were found to be pressure-sensitive adhesive materials. When subjected to the adhesive test described in Example 1, it was found that a force of from about 7 to 18 pounds was required to pull the pressed-together specimens apart.

A polysiloxane elastomer similar in composition to the recipes prepared in this example with the exception that it did not contain an alkoxy-containing silicon material and a boron-containing material was formulated and found to possess physical properties comparable to those of my elastomers; however, such elastomers were not pressure-sensitive adhesive materials either before or after postcuring treatment.

Example 15

To 100 parts of a polysiloxane gum (identical to that described in Example 12) was added 32 parts of finely-divided silica (Cab-O-Sil), 10 parts of an ethoxy end-blocked dimethylpolysiloxane oil having an average of 1 ethoxy group per terminal silicon atom (containing ethoxy groups in an amount by weight of from 12 to 15 percent), 1 part of ethyltriethoxysilane, 0.5 part boric acid, 2 parts of barium zirconate, 2 parts ferric oxide and 1.2 parts of di-tertiarybuytl peroxide by a compounding procedure conducted on a two-roll mill. The formulation was mold-cured by heating to a temperature of 340° F. for a period of twenty minutes. The cured elastomer was then subjected to a postcure for a period of twenty-four hours at a temperature of 480° F. The formulation was, by the above process, molded into a thin sheet (approximately 0.025 inch) having a width and length of 15 inches. The sheet was then cut into tapes of one inch in width and the tapes subsequently wound in overlapping fashion, under tension, about a mandrel. The applied tapes did not slip from the mandrel and did not require any external force to hold them in place. Upon standing it appeared that the polysiloxane elastomer tapes flowed to some extent tightening about the mandrel. On heating the tapes positioned about the various mandrels to temperatures of 350° F., 450° F. and 480° F. for a period of six to twenty-four hours, the over-lapping portions of the polysiloxane tape fused to an essentially homogeneous mass. An attempt to remove the tape from the mandrels without damage thereto was unsuccessful.

A specimen of the prepared tape which had not been wound upon a mandrel but which had been merely subjected to the heating treatment described above was found to be flexible and to be a pressure-sensitive adhesive material.

Example 16

To a polysiloxane gum (identical with that employed in Example 12) was added various reinforcing fillers, a boron-containing material, and an alkoxy-containing silicon material either as an alkoxysilane or as a alkoxy-containing polysiloxane. The various formulations appear in the table below.

TABLE 16-1

[Parts of additives per 100 parts of polysiloxane gum]

| Recipe | Filler | Ethoxy end-blocked [1] dimethylpolysiloxane oil | Ethyltriethoxysilane | Boric acid |
| --- | --- | --- | --- | --- |
| 36 | [2] 40 |  | 1 | 0.5 |
| 37 | [2] 40 | 12 | 1 | 0.5 |
| 38 | [3] 42 |  | 1 | 0.5 |
| 39 | [3] 42 | 12 | 1 | 0.5 |
| 40 | [4] 70 | 15 | 1 | 0.5 |
| 41 | [5] 32 | 10 | 1 | 0.5 |

[1] Containing ethoxy groups in an amount by weight from 10 to 12 percent.
[2] Reinforcing silica (Santocel "CS").
[3] Reinforcing silica (HiSil X303).
[4] 50 parts reinforcing silica, 20 parts diatomaceous silica (Superfloss).
[5] Reinforcing silica (Cab-O-Sil).

To each of the recipes was added 0.6 part of di-chlorobenzoyl peroxide by a compounding technique conducted on a two-roll mill. The catalyzed formulations were mold-cured into thin sections by heating to a temperature of 250° F. for a period of fifteen minutes. The cured elastomers were then subjected to a postcuring treatment for a period of twenty-four hours at a temperature of 480° F. and subsequently tested for their physical properties. The ranges of properties which characterize the elastomers appear below.

RANGES OF PROPERTIES

| Recipe | Hardness (Shore A) | Tensile strength (p.s.i.) | Elongation (percent) | Tear resistance, lb./in. |
|---|---|---|---|---|
| 36–41 | 50–80 | 700–1,050 | 200–350 | 60–115 |

All of the specimens obtained from the various formulations including those that were not postcured were pressure-sensitive adhesive materials. In addition, heated superimposed specimens of unsupported tapes prepared from such elastomers became fused and could not be separated by a pulling force.

*Example 17*

To each of four 100 part portions of a polysiloxane gum (identical with that described in Example 12) was compounded 45 parts of acetylene black, 8 parts of a reinforcing silica (Cab-O-Sil) and 0.5 part of boric acid. The newly formed compositions were compounded with either an ethoxy-containing dimethylpolysiloxane oil or an alkoxysilane, or both. The formulations appear below.

TABLE 17–1

| Recipe | Parts ethyltriethoxysilane | Parts diphenyldiethoxysilane | Parts ethoxy endblocked dimethylpolysiloxane oil [1] |
|---|---|---|---|
| 42 | 1.0 | 0 | 0 |
| 43 | 1.0 | 0 | 6 |
| 44 | 0 | 1.0 | 0 |
| 45 | 0 | 1.0 | 6 |

[1] Containing an average of one ethoxy group per terminal silicon atom in the molecule with the ethoxy groups being present in an amount by weight of 12 percent.

To each of the recipes was added 1.2 parts of di-tertiary-butyl peroxide by a compounding technique conducted on a two-roll mill. The catalyzed formulations were mold-cured into thin sections by heating to a temperature of 340° F. for a period of twenty minutes. The cured elastomers were then subjected to a postcuring treatment for a period of twenty-four hours at a temperature of 480° F. and subsequently tested for their physical properties. The ranges of properties which characterize the elastomers appear below.

RANGES OF PROPERTIES

| Recipe | Hardness (Shore A) | Tensile strength (p.s.i.) | Elongation (percent) | Tear resistance, lb./in. |
|---|---|---|---|---|
| 42–45 | 71–74 | 700–750 | 180–210 | 110–155 |

All of the elastomers were pressure-sensitive adhesive materials. When subjected to the test described in Example 12 for determining their adhesive characteristics, it was found that a force of from 10 to 17 pounds was required to pull the superimposed specimens apart.

Carbon black filled polysiloxane elastomers prepared from formulations identical to those of recipes 42 to 45 but free of a boron-containing material and an alkoxy-containing silicon material are not pressure-sensitive adhesive materials. More specifically, they exhibit no tendency to adhere to each other. In addition, it is also noted that the pressure-sensitive polysiloxane elastomers of the above formulations possess markedly improved tear resistance properties as compared to carbon black filled polysiloxane elastomers outside of my invention. Polysiloxane tapes prepared from recipes 42 to 45 were fused into an essentially homogeneous mass upon heating whereas tapes prepared from the same formulation but free of boric acid and the alkoxy-containing silicon material could not be fused together upon heating.

*Example 18*

Starting with a dimethylpolysiloxane gum having an average molecular weight of from about 400,000 to 600,000 a number of recipes were prepared containing 100 parts of gum, 40 parts of reinforcing silica, 0.5 part of boric acid, and amounts of an alkoxy-containing silicon compound as indicated in the table below.

TABLE 18–1

| Recipe | Parts ethyltriethoxysilane | Parts diphenyldiethoxysilane | Parts ethoxy endblocked dimethylpolysiloxane oil [1] |
|---|---|---|---|
| 46 [2] | 1.0 | 0 | 12.0 |
| 47 [2] | 0 | 1.0 | 12.0 |
| 48 [3] | 1.0 | 0 | 12.0 |
| 49 [3] | 0 | 1.0 | 12.0 |

[1] Containing an average of one ethoxy group per terminal silicon atom in the molecule with the ethoxy groups being present in an amount by weight of 12 percent.
[2] Finely-divided fume silica (Cab-O-Sil).
[3] Finely-divided silica (Dow Corning Silica).

To each of the recipes was added 0.6 part of 2,4-dichlorobenzoyl peroxide by a compounding technique conducted on a two-roll mill. The catalyzed formulations were mold-cured into thin sections by heating to a temperature of 250° F. for a period of fifteen minutes. The cured elastomers were then subjected to a postcure treatment for a period of twenty-four hours at a temperature of 480° F. Each of the sections prepared comprised an unsupported pressure-sensitive adhesive polysiloxane tape.

Elastomers produced from formulations identical to those recipes 46 to 49, but free of a boron-containing material and an alkoxy-containing silicon material were not pressure-sensitive adhesive materials.

*Example 19*

A polysiloxane gum consisting of about 64 percent by weight of dimethylsiloxane units and about 36 percent by weight of 3,3,3-trifluoropropylmethylsiloxane units was compounded with 40 parts of a finely-divided silica, 1 part of ethyltriethoxysilane and 0.5 part of boric acid, on a two-roll mill. The compound was then milled with about 1.2 parts of a peroxide catalyst, the catalyzed compound was mold-cured for a period of ten minutes at a temperature of 250° F. The cured elastomer is a pressure-sensitive adhesive polysiloxane rubber. On the other hand, the same formulation free of ethyltriethoxysilane and boric acid when cured under identical conditions is not a pressure-sensitive adhesive polysiloxane rubber.

*Example 20*

Starting with a polysiloxane gum consisting of dimethylsiloxane units (87.65 percent by weight), ethylvinylsiloxane units (0.35 percent by weight), and diphenylsiloxane units (12.0 percent by weight), a recipe was prepared containing 100 parts of the gum, 40 parts of a reinforcing silica (Cab-O-Sil), 12 parts of an ethoxy end-blocked dimethylpolysiloxane oil (containing ethoxy groups in an silica (Cab-O-Sil), 12 parts of an ethoxy endblocked di- one ethoxy group per terminal silicon atom), 1 part of diphenyldiethoxysilane, and 0.5 part of boric acid, by a milling procedure. The compound was milled with 0.6 part of dichlorobenzoyl peroxide and the catalyzed compound mold-cured by heating at a temperature of 250° F. for a period of fifteen minutes. The cured elastomer was then postcured for a period of twenty-four hours at a temperature of 480° F. The cured, as well as postcured, materials were pressure-sensitive polysiloxane elastomers.

*Example 21*

Starting with a polysiloxane gum consisting of dimethylsiloxane units (49.65 percent by weight), ethylvinylsiloxane units (0.35 percent by weight) and gamma-cyanopropylmethylsiloxane units (50.0 percent by weight), a recipe was prepared containing 100 parts of the gum, 40 parts of a reinforcing silica (HiSil X303), 6 parts of an ethoxy-containing dimethylpolysiloxane oil (containing 12 percent by weight of ethoxy groups), 1 part of diphenyldiethoxysilane, 0.5 part boric acid and 2 parts of iron oxide, by a milling procedure. The compound was milled with 0.9 part of dichlorobenzoyl peroxide and the catalyzed compound mold-cured by heating at a temperature of 250° F. for a period of fifteen minutes. A portion of the cured elastomer was postcured for a period of twenty-four hours at a temperature of 300° F. Polysiloxane tapes prepared from both the mold-cured and postcured specimens were pressure-sensitive adhesive materials and overlapping as well as superimposed specimens of the tapes were fused into an essentially homogeneous mass by heating to a temperature of 300° F.

*Example 22*

To each of five 100-part portions of the polysiloxane gum of Example 1 was added 20 parts of highly reinforcing silica (sold commercially by the Godfrey L. Cabot Company as "Cab-O-Sil") and 60 parts of calcium carbonate (sold commercially by the Norman G. Schabel Company as "Gamaco"), while to each of four of these portions was added a combination of 7.5 parts of an ethoxy-endblocked dimethylpolysiloxane oil (having an average molecular weight of about 750 and an average ethoxy content of about 12 percent by weight) and 7.5 parts of a hydroxy-endblocked dimethylpolysiloxane oil (having an average molecular weight of about 1080 and an average hydroxy content of about 3 percent by weight), and to three of the portions containing the dimethylpolysiloxane oils was added 0.5 part of boric acid and to one of the three boric acid-containing portions was added 1 part of diphenyldiethoxysilane, while to another was added 1 part of diphenylsilanediol. All additions were made during one compounding procedure conducted on a two-roll mill. The recipes of each of the formulations are listed below.

TABLE 22-1

| Formulation | A-4 | B-4 | C-4 | D-4 | E-4 |
|---|---|---|---|---|---|
| Parts polysiloxane gum | 100 | 100 | 100 | 100 | 100 |
| Parts silica | 20 | 20 | 20 | 20 | 20 |
| Parts CaCO₃ | 60 | 60 | 60 | 60 | 60 |
| Parts ethoxy-endblocked dimethylpolysiloxane oil | 0 | 7.5 | 7.5 | 7.5 | 7.5 |
| Parts hydroxy-endblocked dimethylpolysiloxane oil | 0 | 7.5 | 7.5 | 7.5 | 7.5 |
| Parts boric acid | 0 | 0 | 0.5 | 0.5 | 0.5 |
| Parts diphenyldiethoxysilane | 0 | 0 | 0 | 1.0 | 0 |
| Parts diphenylsilanediol | 0 | 0 | 0 | 0 | 1.0 |

Each of the above formulations was added to sufficient toluene to provide dispersions containing from about 28 to about 35 percent by weight of dispersed particles. To each of the dispersions was added 3 parts of crystalline benzoyl peroxide.

Several pieces of No. 116 glass cloth, previously heat cleaned, were dipped into the respective dispersions and then heated at a temperature of about 300° F. for about one-half hour. An organopolysiloxane elastomer coating of approximately 3 mils was deposited on each of the glass cloths as a result of this treatment. When the coated cloths were once again dipped into their respective solutions and the organopolysiloxane formulations cured thereon in a manner similar to that described above, the overall thickness of the organopolysiloxane elastomer coating on each of the glass cloths were found to be approximately 11 mils. Each of the coated glass cloths were then cut into smaller specimens and the crease strength (a measure of elastomer to glass cloth bond) and dielectric strength of the specimens evaluated. The results of these tests are listed below.

TABLE 22-2

| Recipe | Crease strength, lb./inch | Dielectric strength, volts/mil |
|---|---|---|
| A-4 | 85 | 1,050 |
| B-4 | 90 | 1,000 |
| C-4 | 95 | 1,020 |
| D-4 | 105 | 1,150 |
| E-4 | 110 | 1,200 |

Pieces of commercially obtained No. 116 glass cloth (having a coating of starch or other material thereon as applied by the manufacturer) were dipped into the dispersions prepared from formulations of recipes A-4, D-4, and E-4 and cured in a manner similar to that described above. The coated glass cloths were then tested for crease strength and dielectric strength. The results of these tests are listed below.

TABLE 22-3

| Recipe | Crease strength, lb./inch | Dielectric strength, volts/mil |
|---|---|---|
| A-4 | 100 | 1,000 |
| D-4 | 135 | 1,120 |
| E-4 | 145 | 1,150 |

It will be obvious from the results obtained that glass cloths coated with the pressure-sensitive organopolysiloxane elastomers used in preparing the composite articles of this invention (recipes C-4, D-4 and E-4) are characterized by crease strength and dielectric strength properties which are as good as or better than those obtained with glass cloths coated with conventional organopolysiloxane elastomers (receipe A-4). As the surfaces of the elastomers prepared from formulations of recipes C-4, D-4 and E-4 are adhesive in nature, the glass cloths coated with such elastomers can be made to adhere to a wide variety of materials, as well as to each other. Elastomers prepared from formulations of recipes C-4, D-4 and E-4 retained their adhesive properties even after postcures of twenty-four hours at 250° C.

*Example 23*

To each of five 100-part portions of a polysiloxane gum identical with that employed and described in Example 22 was added 35 parts of highly reinforcing, finely-divided silica (sold commercially by the Godfrey L. Cabot Company as "Cab-O-Sil") and 2 parts of iron oxide, while to each of four of these portions was added a combination of 7.5 parts of an ethoxy-endblocked dimethylpolysiloxane oil (having an average molecular weight of about 750 and an average ethoxy content of about 12 percent by weight) and 7.5 parts of a hydroxy-endblocked dimethylpolysiloxane oil (having an average molecular weight of about 1080 and average hydroxy content of about 3 percent by weight), and to three of the portions containing the dimethylpolysiloxane oils was added 0.5 part of boric acid, and to one of the three boric acid-containing portions was added 1 part diphenyldiethoxysilane while to another was added 1 part of diphenylsilanediol. All additions were made during one compounding procedure conducted on a two-roll mill. The recipes of each of the formulations are listed below.

TABLE 23-1

| Formulation | A-5 | B-5 | C-5 | D-5 | E-5 |
|---|---|---|---|---|---|
| Parts polysiloxane gum | 100 | 100 | 100 | 100 | 100 |
| Parts silica | 35 | 35 | 35 | 35 | 35 |
| Parts iron oxide | 2 | 2 | 2 | 2 | 2 |
| Parts ethoxy-endblocked dimethylpolysiloxane oil | 0 | 7.5 | 7.5 | 7.5 | 7.5 |
| Parts hydroxy-endblocked dimethylpolysiloxane oil | 0 | 7.5 | 7.5 | 7.5 | 7.5 |
| Parts boric acid | 0 | 0 | 0.5 | 0.5 | 0.5 |
| Parts diphenyldiethoxysilane | 0 | 0 | 0 | 1.0 | 0 |
| Parts diphenylsilanediol | 0 | 0 | 0 | 0 | 1.0 |

Each of the above formulations was added to sufficient toluene to provide dispersions containing from about 28 to about 35 percent by weight dispersed particles. To each of the dispersions was added three parts of crystalline benzoyl peroxide.

Several pieces of No. 116 glass cloth, previously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths was then cut into smaller specimens and the crease strength (a measure of elastomer to glass cloth bond) and dielectric strength of the specimens evaluated. The results of the tests are listed below.

TABLE 23-2

| Recipe | Crease strength, lb./inch | Dielectric strength, volts/mil |
|---|---|---|
| A-5 | 40-50 | 750-850 |
| B-5 | 80 | 1,000 |
| C-5 | 95 | 1,010 |
| D-5 | 120 | 1,100 |
| E-5 | 130 | 1,150 |

Pieces of commercially obtained No. 116 glass cloth (having a coating of starch or other material thereon as applied by the manufacturer) were dipped into the dispersions prepared from formulations of recipes A-5, D-5 and E-5 and cured in a manner similar to that described above. The coated glass cloths were then tested for crease strength and dielectric strength. The results of these tests are listed below.

TABLE 23-3

| Recipe | Crease strength, lb./inch | Dielectric strength, volts/mil |
|---|---|---|
| A-5 | 40-50 | 750-850 |
| D-5 | 140 | 1,150 |
| E-5 | 135 | 1,125 |

It will be obvious from the results obtained that glass cloths coated with the pressure-sensitive organopolysiloxane elastomers used in preparing the composite articles of this invention (recipes C-5, D-5 and E-5) are characterized by crease strength and dielectric strength properties which are as good as or better than those obtained with glass cloths coated with conventional organopolysiloxane elastomers (recipe A-5). As the surfaces of the elastomers prepared from formulations of recipes C-5, D-5 and E-5 are adhesive in nature, the glass cloths coated with such elastomer can be made to adhere to a wide variety of materials, as well as to each other. Elastomers prepared from formulations of recipes C-5, D-5 and E-5 retained their adhesive properties even after postcures of twenty-four hours at 250° C.

*Example 24*

Following the procedure described in Example 23, organopolysiloxane formulations of recipes A-5, D-5 and E-5 were coated and cured on glass tapes one inch in width. The glass cloth-supported tapes thus prepared were spirally wound in overlapping fashion, under tension, about circular steel bars which were wrapped with a film of polytetrafluoroethylene (in order to prevent adhesion of the elastomer to the steel). The tapes having elastomer coatings prepared from formulations of recipes D-5 and E-5 remained firmly in place without any external force to hold them in place. The tape having an elastomer coating prepared from a formulation of recipe A-5 could not be made to remain in place about the bar without the application of external pressure to hold it in place, and the ends of this tape had to be secured to the bar in order to maintain a firm overwrap.

The three bars thus wrapped in elastomer-coated tapes were heated in an air oven at a temperature of 480° F. for a period of thirty minutes. Upon examination of the three specimens, it was found that the overlapped elastomer portions of the tapes prepared with formulations of recipes D-5 and E-5 had fused together into an essentially homogeneous cylindrical mass and could not be separated without damage to the elastomer. Since the steel bars were wrapped with polytetrafluoroethylene, the fused cylindrical bodies thus formed could be removed therefrom by the application of a pulling force. Upon examination, these duct-like structures were found to be quite rigid and strong.

On the other hand, there was no fusion of the overlapped elastomer portions of the tape prepared with a formulation of recipe A-5 (conventional organopolysiloxane elastomer), and the overlapped portions of said tape were readily separated.

*Example 24-a*

Following the procedure described in Example 23, dispersions of organopolysiloxane formulations of recipes A-5, D-5 and E-5 and benzoyl peroxide in toluene were prepared. Three electrical transformers were dipped into the respective dispersions, allowed to air dry for a period of ten minutes, and then heated at a temperature of about 300° F. for a period of fifteen minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of four hours.

Upon examination of the three specimens, it was found that the elastomer coatings prepared from formulations of recipes D-5 and E-5 were firmly bonded to the metal parts of the transformers. On the other hand, the elastomer coating prepared from a formulation of recipe A-5 did not adhere well to the metal parts of the transformer.

*Example 25*

Following the procedure described in Example 23, dispersions of organopolysiloxane formulations of recipes A-5, D-5 and E-5 and benzoyl peroxide in toluene were prepared. Strips of cotton, wool, nylon (the condensation polymer of hexamethylenediamine with adipic acid) and Dacron (the condensation polymer of methylterephthalate with ethylene glycol) cloth were dipped into the respective dispersions, air dried and then heated at a temperature of about 300° F. for a period of fifteen minutes in order to cure the organopolysiloxane formulations deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips having elastomer coatings prepared from formulations of recipes D-5 and E-5 readily adhered to each other and to the aluminum conduits without any external force to hold them in place. The strips having elastomer coatings prepared from a formulation of recipe A-5 could not be made to adhere to each other or to the aluminum conduits without the application of external pressure to hold them in place, and the ends of these strips had to be secured to the conduits in order to maintain a firm overwrap.

The conduits thus wrapped in elastomer-coated strips were heated for periods of time ranging from thirty minutes to two hours at temperatures ranging from 325°

F. to 480° F. Upon examination of the specimens, it was found that the overlapped elastomer portions of the strips prepared with formulations of recipes D–5 and E–5 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the strips prepared with a formulation of recipe A–5 (conventional organopolysiloxane elastomer), and the overlapped portions of said strips were readily separated from each other and from the aluminum conduits.

*Example 26*

To each of the formulations of recipes A–5, D–5 and E–5 of Example 23 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing two elastomer strips prepared from each of the above formulations on either side of strips of cloth (wool, cotton and nylon, woven fabrics) and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates having elastomer coatings prepared from formulations of recipes D–5 and E–5 readily adhered to each other and to the aluminum conduits without any external force to hold them in place. The laminates having elastomer coatings prepared from a formulation of recipe A–5 could not be made to hold together or to adhere to the aluminum conduits without the application of external pressure to hold them in place, and the ends of these laminates had to be secured to the conduits in order to maintain a firm overlap.

The wrapped conduits thus prepared were then heated at a temperature of about 350° F. for a period of about one hour. Upon examination of the specimens, it was found that the overlapped elastomer portions of the laminates prepared with formulations of recipes D–5 and E–5 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A–5 (conventional organopolysiloxane elastomer), and the overlapped portions of said laminates were readily separated from each other and from the aluminum conduits.

*Example 27*

To each of the formulations of recipes A–5, D–5 and E–5 of Example 23 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of steel, phosphatized steel, aluminum, anodized aluminum and copper on either side of said elastomer strips, and applying a pressure of approximately 1000 pounds per square inch to the outer surfaces of the superimposed metal strips while heating at a temeprature of 480° F. for a period of thirty minutes.

Upon examination of the specimens, it was found that the various metal strips were firmly bonded to the elastomer interlayers prepared from formulations of recipes D–5 and E–5, and could not be separated therefrom without damaging the elastomer. On the other hand, the various metal strips did not adhere to the elastomer interlayers prepared from a formulation of recipe A–5 (conventional organopolysiloxane elastomer), and were readily separated therefrom.

*Example 28*

To each of the formulations of recipes A–5, D–5 and E–5 of Example 23 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of glass sheet $3/16$ of an inch in width on either side of said elastomer strips, and applying a pressure of approximately 50 pounds per square inch to the outer surfaces of the superimposed glass strips while heating at a temperature of about 480° F. for a period of about ten hours.

Upon examination of the specimens, it was found that the glass strips were firmly bonded to the elastomer interlayers prepared from formulations of recipes D–5 and E–5, and could not be separated therefrom by normal force. The bond effected between the glass strips and such elastomers was such that when the laminates were subjected to a blow by a hammer, the glass shattered but was held in place by the elastomer interlayer. On the other hand, the glass strips did not adhere to the elastomer interlayer prepared from a formulation of recipe A–5 (conventional organopolysiloxane elastomer), and were readily separated therefrom.

*Example 29*

To a formulation of recipe D–5 of Example 23 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of fifteen minutes.

The elastomer strip was used to prepare a three-ply laminate by superimposing strips of aluminum foil on either side of said elastomer strip, and applying pressure to the outer surfaces of the superimposed aluminum foil while heating at a temperature of 480° F. for a period of about twenty hours. The resulting laminate was quite flexible and exhibited an excellent alumnium foil-to-elastomer bond.

*Example 30*

Thin organopolysiloxane elastomer tapes were prepared by compounding (by means of a two-roll mill), and heating in a thtin section mold, at a temperature of 350° F. for a period of fifteen minutes, a formulation comprising:

(A) 100 parts of a linear polysiloxane gum containing 12 percent by weight diphenylsiloxane units, 0.35 percent by weight ethylvinylsiloxane units, and 87.65 percent by weight dimethylsiloxane units;

(B) 3 parts of an ethoxy-endblocked polysiloxane oil containing dimethylsiloxane units, methylphenylsiloxane units, and methylvinylsiloxane units, and having an average of 1.5 ethoxy groups bonded to each of the terminal silicon atoms, and 3 parts of a hydroxy-endblocked polysiloxane oil containing dimethylsiloxane units, methylphenylsiloxane units, and methylvinylsiloxane units, and having an average of one hydroxyl group bonded to each of the terminal silicon atoms;

(C) 0.5 part of diphenyldiethoxysilane and 0.5 part of diphenylsilanediol;

(D) 0.5 part of boric acid;

(E) 35 parts of finely-divided silica; and (F) 1.8 parts of dichlorobenzoyl peroxide.

There elastomer strips were used to prepare a series of three-ply laminates similar in structure to those of Examples 26, 27, 28, and 29 (except for the composition of the elastomer) with the aid of pressure at temperatures ranging from 250° F. to 480° F. The resulting laminates exhibited excellent elastomer-to-metal, elastomer-to-glass and elastomer-to-cloth bonds.

Elastomer strips prepared from the same formulation free of a combination of ethoxy- and hydroxy-containing silicon materials and boric acid were not pressure-sensitive adhesive materials and could not be used to prepare laminates.

*Example 31*

An organopolysiloxane formulation was prepared by compounding the following ingredients on a two-roll mill:

(A) 100 parts of a linear polysiloxane gum containing 50 percent by weight gamma-cyanopropylmethylsiloxane units and 50 percent by weight dimethylsiloxane units;

(B) 3 parts of an ethoxy-endblocked polysiloxane oil containing dimethylsiloxane units, methylphenylsiloxane units and methylvinylsiloxane units, and having an average of 1.5 ethoxy groups bonded to each of the terminal silicon atoms, and 3 parts of a hydroxy-endblocked polysiloxane oil containing dimethylsiloxane units, methylphenylsiloxane units, and methylvinylsiloxane units, and having an average of one hydroxyl group bonded to each of the terminal silicon atoms;

(C) 0.5 part of methyldiethoxysilane and 0.5 part of diphenylsilanediol;

(D) 0.5 part of boric acid;

(E) 40 parts of finely-divided silica; and (F) 2 parts of iron oxide.

This formulation was added to sufficient toluene to provide a dispersion containing about 30 percent by weight of dispersed solids. To the dispersion was added 3.5 parts of crystalline benzoyl peroxide.

A strip of No. 116 glass cloth, previously heat cleaned, was dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 10 mils.

When the glass cloth supported tape thus prepared was spirally wound in overlapping fashion, under tension, about an electric cable, it readily adhered to itself and to the electric cable without any external force to hold it in place.

The cable thus wrapped in elastomer-coated tape was heated at a temperature of 300° F. for a period of four hours. Upon examination of the specimen, it was found that the overlapped portions of the tape had fused in an essentially homogeneous cylindrical mass, and that the elastomer surfaces in contact with the surface of the cable had become strongly adhered thereto.

Glass-supported tapes prepared from glass cloth and the same formulation free of combination of ethoxy- and hydroxy-containing silicon materials and boric acid were not pressure-sensitive adhesive materials and would not adhere to an electric cable even after subjected to a heating treatment.

*Example 32*

An organopolysiloxane formulation was prepared by compounding the following ingredients on a two-roll mill:

(A) 100 parts of a linear polysiloxane gum containing methylvinylsiloxane units and dimethylsiloxane units;

(B) 3 parts of an ethoxy-endblocked polysiloxane oil containing dimethylsiloxane units, methylphenylsiloxane units, and methylvinylsiloxane units, and having an average of 1.5 ethoxy groups bonded to each of the terminal silicon atoms, and 3 parts of a hydroxy-endblocked polysiloxane oil containing dimethylsiloxane units, methylphenylsiloxane units, and methylvinylsiloxane units, and having an average of one hydroxyl group bonded to each of the terminal silicon atoms;

(C) 0.5 part of diphenyldiethoxysilane and 0.5 part of diphenylsilanediol;

(D) 0.5 part of boric acid;

(E) 50 parts of carbon black; and (F) 8 parts of finely-divided silica.

This formulation was added to sufficient toluene to provide a dispersion containing about 30 percent by weight of dispersed solids. To the dispersion was added 3 parts of dicumyl peroxide.

Several strips of No. 116 glass cloth, previously heat cleaned, were dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 8 mils.

The glass cloth-supported tapes thus prepared readily adhered to glass plates, steel sheets and nylon film. When such materials were superimposed on either side of said tapes and pressure applied to the outer surfaces of the superimposed materials while heating at a temperature of about 300° F., relatively strong bonds were obtained.

*Example 33*

To each of five 100-part portions of the polysiloxane gum of Example 1 was added 20 parts of highly reinforcing silica (sold commercially by the Godfrey L. Cabot Company as "Cab-O-Sil") and 60 parts of calcium carbonate (sold commercially by the Norman G. Schabel Company as "Gamaco"), while to each of four of these portions was added 15 parts of an above-prepared dimethylpolysiloxane oil (having an average molecular weight of about 820 and an average ethoxy content of about 10 percent by weight), and to three of the portions containing the dimethylpolysiloxane oil was added 0.5 part of boric acid, and to one of the three boric acid-containing portions was added 1 part of diphenyldiethoxysilane while to another was added 1 part of ethyltriethoxysilane. All additions were made during one compounding procedure conducted on a two-roll mill. The recipes of each of the formulations are listed below:

TABLE 33-1

| Formulation | A-6 | B-6 | C-6 | D-6 | E-6 |
|---|---|---|---|---|---|
| Parts polysiloxane gum | 100 | 100 | 100 | 100 | 100 |
| Parts silica | 20 | 20 | 20 | 20 | 20 |
| Parts CaCO₃ | 60 | 60 | 60 | 60 | 60 |
| Parts Ethoxy-endblocked Dimethylpolysiloxane oil | 0 | 15 | 15 | 15 | 15 |
| Parts boric acid | 0 | 0 | 0.5 | 0.5 | 0.5 |
| Parts ethyltriethoxysilane | 0 | 0 | 0 | 1.0 | 0 |
| Parts diphenyldiethoxysilane | 0 | 0 | 0 | 0 | 1.0 |

Each of the above formulations was added to sufficient toluene to provide dispersions containing from about 28 to about 35 percent by weight of dispersed particles. To each of the dispersions was added 3 parts of crystalline benzoyl peroxide.

Several pieces of No. 116 glass cloth, previously heat cleaned, were dipped into the respective dispersions and then heated at a temperature of about 300° F. for about one-half hour. An organopolysiloxane elastomer coating of approximately 3 mils was deposited on each of the glass cloths as a result of this treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths were then cut into smaller specimens and the crease strength (a measure of elastomer to glass cloth bond) and dielectric strength of the specimens evaluated. The results of these tests are listed below:

TABLE 33-2

| Recipe | Crease strength, lb./inch | Dielectric strength, volts/mil |
|---|---|---|
| A-6 | 85 | 1,050 |
| B-6 | 90 | 950 |
| C-6 | 85 | 1,000 |
| D-6 | 95 | 1,050 |
| E-6 | 100 | 1,180 |

Pieces of commercially obtained No. 116 glass cloth (having a coating of starch or other material thereon as applied by the manufacturer) were dipped into the dispersions prepared from formulations of recipes A-6, D-6 and E-6 and cured in a manner similar to that described above. The coated glass cloths were then tested for crease strength and dielectric strength. The results of these tests are listed below:

TABLE 33-3

| Recipe | Crease strength, lb./inch | Dielectric strength, volts/mil |
|---|---|---|
| A-6 | approx. 100 | 1,000 |
| D-6 | 130 | 1,110 |
| E-6 | 145 | 1,100 |

It will be obvious from the results obtained that glass cloths coated with the pressure-sensitive organopolysiloxane elastomers used in preparing the composite articles of the invention (recipes C-6, D-6 and E-6) are characterized by crease strength and dielectric strength properties which are as good as or better than those obtained with glass cloths coated with conventional organopolysiloxane elastomers (receipe A-6). As the surfaces of the elastomers prepared from formulations of recipes C-6, D-6 and E-6 are adhesive in nature, the glass cloths coated with such elastomers can be made to adhere to a wide variety of materials as well as to each other. Elastomers prepared from formulations of recipes C-6, D-6, and E-6 retained their adhesive properties even after postcures of twenty-four hours at 250° C.

*Example 34*

To each of five 100-part portions of a polysiloxane gum identical with that employed and described in Example 33 was added 35 parts of highly reinforcing, finely-divided silica (sold commercially by the Godfrey L. Cabot Company as "Cab-O-Sil") and 2 parts of iron oxide, while to each of four of these portions was added 15 parts of an ethoxy-endblocked dimethylpolysiloxane oil (having an average molecular weight of about 750 and an average ethoxy content of about 12 percent by weight), and to three of the portions containing the dimethylpolysiloxane oil was added 0.5 part of boric acid, and to one of the three boric acid-containing portions was added 1 part of diphenyldiethoxysilane while to another was added 1 part of ethyltriethoxysilane. All additions were made during one compounding procedure conducted on a two-roll mill. The recipes of each of the formulations are listed below:

TABLE 34-1

| Formulation | A-7 | B-7 | C-7 | D-7 | E-7 |
|---|---|---|---|---|---|
| Parts polysiloxane gum | 100 | 100 | 100 | 100 | 100 |
| Parts silica | 35 | 35 | 35 | 35 | 35 |
| Parts iron oxide | 2 | 2 | 2 | 2 | 2 |
| Parts ethoxy-endblocked dimethyloplysiloxane oil | 0 | 15 | 15 | 15 | 15 |
| Parts boric acid | 0 | 0.5 | 0.5 | 0.5 | 0.5 |
| Parts ethyltriethoxysilane | 0 | 0 | 0 | 1.0 | 0 |
| Parts diphenyldiethoxysilane | 0 | 0 | 0 | 0 | 1.0 |

Each of the above formulations was added to sufficient toluene to provide dispersions containing from about 28 to about 35 percent by weight dispersed particles. To each of the dispersions was added three parts of crystalline benzoyl peroxide.

Several pieces of No. 116 glass cloth, previously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths was then cut into smaller specimens and the crease strength (a measure of elastomer to glass cloth bond) and dielectric strength of the specimens evaluated. The results of the tests are listed below:

TABLE 34-2

| Recipe | Crease strength, lb./inch | Dielectric strength, volts/mil |
|---|---|---|
| A-7 | 40 | 750 |
| B-7 | 80 | 1,000 |
| C-7 | 90 | 1,020 |
| D-7 | 110 | 1,050 |
| E-7 | 120 | 1,150 |

Pieces of commercially obtained No. 116 glass cloth (having a coating of starch or other material thereon as applied by the manufacturer) were dipped into the dispersions prepared from formulations of recipes A-7, D-7 and E-7 and cured in a manner similar to that described above. The coated glass cloths were then tested for crease strength and dielectric strength. The results of these tests are listed below:

TABLE 34-3

| Recipe | Crease strength, lb./inch | Dielectric strength, volts/mil |
|---|---|---|
| A-7 | 50 | 800 |
| D-7 | 120 | 1,100 |
| E-7 | 145 | 1,150 |

It will be obvious from the results obtained that glass cloths coated with the pressure-sensitive organopolysiloxane elastomers used in preparing the composite articles of this invention (recipes C-7, D-7 and E-7) are characterized by crease strength and dielectric strength properties which are as good as or better than those obtained with glass cloths coated with conventional organopolysiloxane elastomers (recipe A-7). As the surfaces of the elastomers prepared from formulations of recipes C-7, D-7 and E-7 are adhesive in nature, the glass cloths coated with such elastomers can be made to adhere to a wide variety of materials, as well as to each other. Elastomers prepared from formulations of recipes C-7, D-7 and E-7 retained their adhesive properties even after postcures of twenty-four hours at 250° F.

*Example 35*

Following the procedure described in Example 34, organopolysiloxane formulations of recipes A-7, D-7, and E-7 were coated and cured on glass tapes one inch in width. The glass cloth-supported tapes thus prepared were spirally wound in overlapping fashion, under tension, about circular steel bars which were wrapped with a film of polytetrafluoroethylene (in order to prevent adhesion of the elastomer to the steel). The tapes having elastomer coatings prepared from formulations of recipes D-7 and E-7 remained firmly in place without any external force to hold them in place. The tape having an elastomer coating prepared from a formulation of recipe A-7 could not be made to remain in place about the bar without the application of external pressure to hold it in place, and the ends of this tape had to be secured to the bar in order to maintain a firm overwrap.

The three bars thus wrapped in elastomer-coated tapes were heated in an air oven at a temperature of 480° F. for a period of thirty minutes. Upon examination of the three specimens, it was found that the overlapped elastomer portions of the tapes prepared with formulations of recipes D-7 and E-7 had fused together into an essentially homogeneous cylindrical mass and could not be separated without damage to the elastomer. Since the steel bars were wrapped with polytetrafluoroethylene, the fused cylindrical bodies thus formed could be removed therefrom by the application of a pulling force. Upon examination, these duct-like structures were found to be quite rigid and strong.

On the other hand, there was no fusion of the overlapped elastomer portions of the tape prepared with a formulation of recipe A-7 (conventional organopolysiloxane elastomer), and the overlapped portions of said tape were readily separated.

*Example 36*

Following the procedure described in Example 34, dispersions of organopolysiloxane formulations of recipes A-7, D-7 and E-7 and benzoyl peroxide in toluene were prepared. Three electrical transformers were dipped into the respective dispersions, allowed to air dry for a period of ten minutes, and then heated at a temperature of about 300° F. for a period of fifteen minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of four hours.

Upon examination of the three specimens, it was found that the elastomer coatings prepared from formulations of recipes D-7 and E-7 were firmly bonded to the metal parts of the transformers. On the other hand, the elastomer coating prepared from a formulation of recipe A-7 did not adhere well to the metal parts of the transformer.

*Example 37*

Following the procedure described in Example 34, dispersions of organopolysiloxane formulations of recipes A-7, D-7 and E-7 and benzoyl peroxide in toluene were prepared. Strips of cotton, wool, nylon (condensation polymer of hexamethylenediamine with adipic acid) and Dacron (the condensation polymer of methyl terephthalate with ethylene glycol) cloth were dipped into the respective dispersions, air dried, and then heated at a temperature of about 300 F. for a period of fifteen minutes in order to cure the organopolysiloxane formulations deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips having elastomer coatings prepared from formations of recipes D-7 and E-7 readily adhered to each other and to the aluminum conduits without any external force to hold them in place. The strips having elastomer coatings prepared from a formulation of recipe A-7 could not be made to adhere to each other or to the aluminum conduits without the application of external pressure to hold them in place, and the ends of these strips had to be secured to the conduits in order to maintain a firm overwrap.

The conduits thus wrapped in elastomer-coated strips were heated for periods of time ranging from thirty minutes to two hours at temperatures ranging from 325° F. to 480° F. Upon examination of the specimens, it was found that the overlapped elastomer portions of the strips prepared with formulations of recipes D-7 and E-7 had fused together into as essentially homogeneous cylindrical mass, and that the elastomer surfaces in contact with the outer surfaces of the aluminum conduits had become strongly adhered thereto. On the other hand, there was no fusion or adherence of the elastomer surfaces of the strips prepared with a formulation of recipe A-7 (conventional organopolysiloxane elastomer), and the overlapped portions of said strips were readily separated from each other and from the aluminum conduits.

*Example 38*

To each of the formulations of recipes A-7, D-7 and E-7 of Example 34 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing two elastomer strips prepared from each of the above formulations on either side of strips of cloth (wool, cotton and nylon woven fabrics) and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates having elastomer coatings prepared from formulations of recipes D-7 and E-7 readily adhered to each other and to the aluminum conduits without any external force to hold them in place. The laminates having elastomer coatings prepared from a formulation of recipe A-7 could not be made to hold together or to adhere to the aluminum conduits without the application of external pressure to hold them in place, and the ends of these laminates had to be secured to the conduits in order to maintain a firm overlap.

The wrapped conduits thus prepared were then heated at a temperature of about 350° F. for a period of about one hour. Upon examination of the specimens, it was found that the overlapped elastomer portions of the laminates prepared with formulations of recipes D-7 and E-7 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A-7 (conventional organopolysiloxane elastomer), and the overlapped portions of said laminates were readily separated from each other and from the aluminum conduits.

*Example 39*

To each of the formulations of recipes A-7, D-7 and E-7 of Example 34 were added 1.5 parts of dischlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of steel, phosphatized steel, aluminum, anodized aluminum and copper on either side of said elastomer strips, and applying a pressure of approximately 1000 pounds per square inch to the outer surfaces of the superimposed metal strips while heating at a temperature of 480° F. for a period of thirty minutes.

Upon examination of the specimens, it was found that the various metal strips were firmly bonded to the elastomer interlayers prepared from formulations of recipes D-7 and E-7, and could not be separated therefrom without damaging the elastomer. On the other hand, the various metal strips did not adhere to the elastomer interlayers prepared from a formulation of recipe A-7 (conventional organopolysiloxane elastomer), and were readily separated therefrom.

*Example 40*

To each of the formulations of recipes A-7, D-7 and E-7 of Example 34 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of glass sheet 3/16 of an inch in thickness on either side of said elastomer strips, and applying a pressure of approximately 50 pounds per square inch to the outer surfaces of the superimposed glass strips while heating at a temperature of about 480° F. for a period of about ten hours.

Upon examination of the specimens, it was found that the glass strips were firmly bonded to the elastomer interlayers prepared from formulations of recipes D-7 and E-7, and could not be separated therefrom by manual force. The bond effected between the glass strips and such elastomers was such that when the laminates were subjected to a blow by a hammer, the glass shattered but was held in place by the elastomer interlayer. On the other hand, the glass strips did not adhere to elastomer interlayer prepared from a formulation of recipe A-7 (conventional organopolysiloxane elastomer), and were readily separated therefrom.

*Example 41*

To a formulation of recipe D-7 of Example 34 were added 1.5 parts of dichlorobenzoyl peroxide during a compounding procedure conducted on a two-roll mill. The catalyzed formulation was mold-cured into a thin section mold by heating at a temperature of 250° F. for a period of fifteen minutes.

The elastomer strip was used to prepare a three-ply laminate by superimposing strips of aluminum foil on either side of said elastomer strip, and applying pressure to the outer surfaces of the superimposed aluminum foil while heating at a temperature of 480° F. for a period of about twenty hours. The resulting laminate was quite flexible and exhibited an excellent aluminum foil-to-elastomer bond.

*Example 42*

Thin organopolysiloxane elastomer tapes were prepared by compounding (by means of a two-roll mill), and heating in a thin section mold, at a temperature of 350° F. for a period of fifteen minutes, a formulation comprising:

(A) 100 parts of a linear polysiloxane gum containing 12 percent by weight diphenylsiloxane units, 0.35 percent by weight ethylvinylsiloxane units, and 87.65 percent by weight dimethylsiloxane units;
(B) 6 parts of an ethoxy-endblocked polysiloxane oil containing dimethylsiloxane units, methylphenylsiloxane units, and methylvinylsiloxane units, and having an average of 1.5 ethoxy groups bonded to each of the terminal silicon atoms;
(C) 1 part of methylphenyldiethoxysilane;
(D) 0.5 part of boric acid;
(E) 35 parts of finely-divided silica; and
(F) 1.8 parts of dichlorobenzoyl peroxide.

These elastomer strips were used to prepare a series of three-ply laminates similar in structure to those of Examples 38, 39, 40, and 41 (except for the composition of the elastomer) with the aid of pressure at temperatures ranging from 250° F. to 480° F. the resulting laminates exhibited excellent elastomer-to-metal, elastomer-to-glass and elastomer-to-cloth bonds.

Elastomer strips prepared from the same formulation free of a combination of ethoxy-containing silicon materials and boric acid were not pressure-sensitive adhesive materials and could not be used to prepare laminates.

*Example 43*

An organopolysiloxane formulation was prepared by compounding the following ingredients on a two-roll mill:

(A) 100 parts of a linear polysiloxane gum containing 50 percent by weight gamma-cyanopropylmethylsiloxane units and 50 percent by weight dimethylsiloxane units;
(B) 6 parts of an ethoxy-endblocked dimethylpolysiloxane oil having an average molecular weight of about 978 and an average ethoxy content of about 9.2 percent by weight with an average of one ethoxy group bonded to each of the terminal silicon atoms;
(C) 1 part of methylphenyldiethoxysilane;
(D) 0.5 part of boric acid;
(E) 40 parts of finely-divided silica; and
(F) 2 parts of iron oxide.

This formulation was added to sufficient toluene to provide a dispersion containing about 30 percent by weight of dispersed solids. To the dispersion was added 3.5 parts of crystalline benzoyl peroxide.

A strip of No. 116 glass cloth, previously heat cleaned, was dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 10 mils.

When the glass cloth-supported tape thus prepared was spirally wound in overlapping fashion, under tension, about an electric cable, it readily adhered to itself and to the electric cable without any external force to hold it in place.

The cable thus wrapped in elastomer-coated tape was heated at a temperature of 300° F. for a period of four hours. Upon examination of the specimen, it was found that the overlapped portions of the tape had fused into an essentially homogeneous cylindrical mass, and that the elastomer surfaces in contact with the surface of the cable had become strongly adhered thereto.

Glass-supported tapes prepared from glass cloth and the same formulation free of ethoxy-containing silicon materials and boric acid were not pressure-sensitive adhesive materials and would not adhere to an electric cable even after subjected to a heating treatment.

*Example 44*

An organopolysiloxane formulation was prepared by compounding the following ingredients on a two-roll mill:

(A) 100 parts of a linear polysiloxane gum containing methylvinylsiloxane units and dimethylsiloxane units;
(B) 6 parts of an ethoxy-endblocked dimethylpolysiloxane oil having an average molecular weight of about 682 and an average ethoxy content of about 13.2 percent by weight with an average of one ethoxy group bonded to each of the terminal silicon atoms;
(C) 1 part of diphenyldiethoxysilane;
(D) 0.5 part of boric acid;
(E) 50 parts of carbon black; and
(F) 8 parts of finely-divided silica.

This formulation was added to sufficient toluene to provide a dispersion containing about 30 percent by weight of dispersed solids. To the dispersion was added 3 parts of dicumyl peroxide.

Several strips of No. 116 glass cloth, previously heat cleaned, were dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 8 mils.

The glass cloth-supported tapes thus prepared readily adhere to glass plates, steel sheets and nylon film. When such materials were superimposed on either side of said tapes and pressure applied to the outer surfaces of the superimposed materials while heating at a temperature of about 300° F., relatively strong bonds were obtained.

*Example 45*

To each of four 100-part portions of the polysiloxane gum of Example 1 was added 20 parts of highly reinforcing silica (sold commercially by the Godfrey L. Cabot Company as "Cab-O-Sil") and 60 parts of calcium carbonate (sold commercially by the Norman G. Schabel Company as "Gamaco"), while to each of three of these portions was added 15 parts of an above-prepared dimethypolysiloxane oil (having an average molecular weight of about 1080 and an average hydroxy content of about 3 percent by weight), and to two of the portions containing the dimethylpolysiloxane oil was added 0.5 part of boric acid, and to one of the two boric acid-containing portions was added 1 part of diphenylsilanediol. All additions were made during one compounding procedure conducted on a two-roll mill. The recipes of each of the formulations are listed below:

TABLE 45-1

| Formulation | A-8 | B-8 | C-8 | D-8 |
|---|---|---|---|---|
| Parts polysiloxane gum | 100 | 100 | 100 | 100 |
| Parts silica | 20 | 20 | 20 | 20 |
| Parts CaCO$_3$ | 60 | 60 | 60 | 60 |
| Parts hydroxy-endblocked dimethylpolysiloxane oil | 0 | 15 | 15 | 15 |
| Parts boric acid | 0 | 0 | 0.5 | 0.5 |
| Parts diphenylsilanediol | 0 | 0 | 0 | 1 |

Each of the above formulations was added to sufficient toluene to provide dispersions containing from about 28 to about 35 percent by weight of dispersed particles. To each of the dispersions was added 3 parts of crystalline benzoyl peroxide.

Several pieces of No. 116 glass cloth, previously heat cleaned, were dipped into the respective dispersions and then heated at a temperature of about 300° F. for about one-half hour. An organopolysiloxane elastomer coating of approximately 3 mils was deposited on each of the glass cloths as a result of this treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths was then cut into smaller specimens and the crease strength (a measure of elastomer-to-glass cloth bond) and dielectric strength of the specimens evaluated. The results of these tests are listed below:

TABLE 45-2

| Recipe | Crease strength, lb./inch | Dielectric strength, volts/mil |
|---|---|---|
| A-8 | 85 | 1,050 |
| B-8 | 95 | 975 |
| C-8 | 90 | 1,000 |
| D-8 | 100 | 1,150 |

Pieces of commercially obtained No. 116 glass cloth (having a coating of starch or other material thereon as applied by the manufacturer) were dipped into the dispersions prepared from formulations of recipes A-8 and D-8 and cured in a manner similar to that described above. The coated glass cloths were then tested for crease strength and dielectric strength. The results of these tests are listed below:

TABLE 45-3

| Recipe | Crease strength, lb./inch | Dielectric strength, volts/mil |
|---|---|---|
| A-8 | 100 | 1,000 |
| D-8 | 125 | 1,080 |

It will be obvious from the results obtained that glass cloths coated with the pressure-sensitive organopolysiloxane elastomers used in preparing the composite articles of the invention (recipes C-8, D-8 and E-8) are characterized by crease strength and dielectric strength properties which are as good as or better than those obtained with glass cloths coated with conventional organopolysiloxane elastomers (recipe A-8). As the surfaces of the elastomers prepared from formulations of recipes C-8, D-8 and E-8 are adhesive in nature, the glass cloths coated with such elastomers can be made to adhere to a wide variety of materials as well as to each other. Elastomers prepared from formulations of recipes C-8 and D-8 retained their adhesive properties even after postcures of twenty-four hours at 250° C.; however, elastomers prepared from formulations of recipe D-8 exhibited substantially better adhesive properties than those prepared from formulations of recipe C-8 which contained no diphenyl-silanediol.

*Example 46*

To each of four 100-part portions of a polysiloxane gum identical with that employed and described in Example 45 was added 35 parts of highly reinforcing finely-divided silica (sold commercially by the Godfrey L. Cabot Company as "Cab-O-Sil") and 2 parts of iron oxide, while to each of three of these portions was added 15 parts of a hydroxy-endblocked dimethylpolysiloxane oil (having an average molecular weight of about 1080 and an average hydroxy content of about 3 percent by weight), and to two of the portions containing the dimethylpolysiloxane oil was added 0.5 part of boric acid, and to one of the two boric acid-containing portions was added 1 part of diphenylsilanediol. All additions were made during one compounding procedure conducted on a two-roll mill. The recipes of each of the formulations are listed below:

TABLE 46-1

| Formulation | A-9 | B-9 | C-9 | D-9 |
|---|---|---|---|---|
| Parts polysiloxane gum | 100 | 100 | 100 | 100 |
| Parts silica | 35 | 35 | 35 | 35 |
| Parts iron oxide | 2 | 2 | 2 | 2 |
| Parts hydroxy-endblocked dimethylpolysiloxane oil | 0 | 15 | 15 | 15 |
| Parts boric acid | 0 | 0 | 0.5 | 0.5 |
| Parts diphenylsilanediol | 0 | 0 | 0 | 1.0 |

Each of the above formulations was added to sufficient toluene to provide dispersions containing from about 28 to about 35 percent by weight dispersed particles. To each of the dispersions was added three parts of crystalline benzoyl peroxide.

Several pieces of No. 116 glass cloth, previously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths was then cut into smaller specimens and the crease strength (a measure of elastomer-to-glass cloth bond) and dielectric strength of the specimens evaluated. The results of the tests are listed below:

TABLE 46-2

| Recipe | Crease strength, lb./inch | Dielectric strength, volts/mil |
|---|---|---|
| A-9 | 40 | 800 |
| B-9 | 85 | 975 |
| C-9 | 90 | 1,000 |
| D-9 | 120 | 1,100 |

Pieces of commercially obtained No. 116 glass cloth (having a coating of starch or other material thereon as applied by the manufacturer) were dipped into the dispersions prepared from formulations of recipes A-9 and D-9 and cured in a manner similar to that described above. The coated glass cloths were then tested for crease strength and dielectric strength. The results of these tests are listed below:

TABLE 46-3

| Recipe | Crease strength, lb./inch | Dielectric strength, volts/mil |
|---|---|---|
| A-9 | 50 | 800 |
| D-9 | 135 | 1,130 |

It will be obvious from the results obtained that glass cloths coated with the pressure-sensitive organopolysiloxane elastomers used in preparing the composite articles of this invention (recipes C-9, D-9 and E-9) are characterized by crease strength and dielectric strength properties which are as good as or better than those obtained with glass cloths coated with conventional organopolysiloxane elastomers (recipe A-9). As the surfaces of the elastomers prepared from formulations of recipes C-9, D-9 and E-9 are adhesive in nature, the glass cloths coated with such elastomers can be made to adhere to a wide variety of materials, as well as to each other. Elastomers prepared from formulations of recipes C-9 and D-9 retained their adhesive properties even after postcures of twenty-four hours at 250° C.; however, elastomers prepared from formulations of recipe D-9 exhibited substantially better adhesive properties than those prepared from formulations of recipe C-9 which contained no diphenylsilanediol.

*Example 47*

Following the procedure described in Example 46, organopolysiloxane formulations of recipes A-9 and D-9 were coated and cured on glass tapes one inch in width. The glass cloth-supported tapes thus prepared were spirally wound in overlapping fashion, under tension, about circular steel bars which were wrapped with a film of polytetrafluoroethylene (in order to prevent adhesion of the elastomer to the steel). The tape having an elastomer coating prepared from a formulation of recipe D-9 remained firmly in place without any external force to hold it in place. The tape having an elastomer coating prepared from a formulation of recipe A-9 could not be made to remain in place about the bar without the application of external pressure to hold it in place, and the ends of this tape had to be secured to the bar in order to maintain a firm overwrap.

The two bars thus wrapped in elastomer-coated tapes were heated in an air oven at a temperature of 480° F. for a period of thirty minutes. Upon examination of the two specimens, it was found that the overlapped elastomer portions of the tape prepared with a formulation of recipe D-9 had fused together into an essentially homogeneous cylindrical mass and could not be separated without damage to the elastomer. Since the steel bar was wrapped with polytetrafluoroethylene, the fused cylindrical body thus formed could be removed therefrom by the application of a pulling force. Upon examination, these duct-like structures were found to be quite rigid and strong.

On the other hand, there was no fusion of the overlapped elastomer portions of the tape prepared with a formulation of recipe A-9 (conventional organopolysiloxane elastomer), and the overlapped portions of said tape were readily separated.

*Example 48*

Following the procedure described in Example 46, dispersions of organopolysiloxane formulations of recipes A-9 and D-9 and benzoyl peroxide in toluene were prepared. Two electrical transformers were dipped into the respective dispersions, allowed to air dry for a period of ten minutes, and then heated at a temperature of about 300° F. for a period of fifteen minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of four hours.

Upon examination of the three specimens, it was found that the elastomer coating prepared from a formulation of recipe D-9 was firmly bonded to the metal parts of the transformer. On the other hand, the elastomer coating prepared from a formulation of recipe A-9 did not adhere well to the metal parts of the transformer.

*Example 49*

Following the procedure described in Example 46, dispersions of organopolysiloxane formulations of recipes A-9 and D-9 and benzoyl peroxide in toluene were prepared. Strips of cotton, wool, nylon (the condensation polymer of hexamethylenediamine with adipic acid) and dacron (the condensation polymer of methyl terephthalate with ethylene glycol) cloth were dipped into the respective dispersions, air dried, and then heated at a temperature of about 300° F. for a period of fifteen minutes in order to cure the organopolysiloxane formulations deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about a hollow aluminum conduit. The strips having elastomer coatings prepared from a formulation of recipe D-9 readily adhered to each other and to the aluminum conduit without any external force to hold them in place. The strips having elastomer coatings prepared from a formulation of recipe A-9 could not be made to adhere to each other or to the aluminum conduit without the application of external pressure to hold them in place, and the ends of these strips had to be secured to the conduit in order to maintain a firm overwrap.

The conduit thus wrapped in elastomer-coated strips was heated for periods of time ranging from thirty minutes to two hours at temperatures ranging from 325° F. to 480° F. Upon examination of the specimens, it was found that the overlapped elastomer portions of the strips prepared with a formulation of recipe D-9 had fused together into an essentially homogeneous cylindrical mass, and that the elastomer surfaces in contact with the outer surfaces of the aluminum conduit had become strongly adhered thereto. On the other hand, there was no fusion or adherence of the elastomer surfaces of the strips prepared with a formulation of recipe A-9 (conventional organopolysiloxane elastomer), and the overlapped portions of said strips were readily separated from each other and from the aluminum conduit.

*Example 50*

To each of the formulations of recipes A-9 and D-9 of Example 46 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing two elastomer strips prepared from each of the above formulations on either side of strips of cloth (wool, cotton and nylon woven fabric) and applying a pressure of approximately 300 pounds per square inch to the outer surfaces of the superimposed elastomer strips while heating at a temperature in the range of from 250° F. to 340° F.

The laminates thus prepared were spirally wound in overlapping fashion, under tension, about hollow aluminum conduits. The laminates having elastomer coatings prepared from a formulation of recipe D-9 readily adhered to each other and to the aluminum conduits without any external force to hold them in place. The laminates having elastomer coatings prepared from a formulation of recipe A-9 could not be made to hold together or to adhere to the aluminum conduits without the application of external pressure to hold them in place, and the ends of these laminates had to be secured to the conduits in order to maintain a firm overwrap.

The wrapped conduits thus prepared were then heated at a temperature of about 350° F. for a period of about one hour. Upon examination of the specimens, it was found that the overlapped elastomer portions of the laminates prepared with a formulation of recipe D-9 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A-9 (conventional organopolysiloxane elastomer), and the overlapped portions of said laminates were readily separated from each other and from the aluminum conduits.

*Example 51*

To each of the formulations of recipes A-9 and D-9 of Example 46 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of steel, phosphatized steel, aluminum, anodized aluminum, and copper on either side of said elastomer strips, and applying a pressure of approximately 1000 pounds per square inch to the outer surface of the superimposed metal strips while heating at a temperature of 480° F. for a period of thirty minutes.

Upon examination of the specimens, it was found that the various metal strips were firmly bonded to the elastomer interlayers prepared from a formulation of recipe D-9 and could not be separated therefrom without damaging the elastomer. On the other hand, the various metal strips did not adhere to the elastomer interlayers prepared from a formulation of recipe A-9 (conventional organopolysiloxane elastomer), and were readily separated therefrom.

*Example 52*

To each of the formulations of recipes A-9 and D-9 of Example 46 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of fifteen minutes.

These elastomer strips were used to prepare a series of three-ply laminates by superimposing strips of glass sheet ³⁄₁₆ of an inch in width on either side of said elastomer strips, and applying a pressure of approximately 50 pounds per square inch to the outer surfaces of the superimposed glass strips while heating at a temperature of about 480° F. for a period of about ten hours.

Upon examination of the specimens, it was found that the glass strips were firmly bonded to the elastomer interlayer prepared from a formulation of recipe D-9 and could not be separated therefrom by manual force. The bond effected between the glass strips and such elastomer was such that when the laminate was subjected to a blow by a hammer, the glass shattered but was held in place by the elastomer interlayer. On the other hand, the glass strips did not adhere to the elastomer interlayer prepared from a formulation of recipe A-9 (conventional organopolysiloxane elastomer), and were readily separated therefrom.

*Example 53*

To a formulation of recipe D-9 of Example 46 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of fifteen minutes.

The elastomer strip was used to prepare a three-ply laminate by superimposing strips of aluminum foil on either side of said elastomer strip, and applying pressure to the outer surfaces of the superimposed aluminum foil while heating at a temperature of 480° F. for a period of about twenty hours. The resulting laminate was quite flexible and exhibited an excellent aluminum foil-to-elastomer bond.

*Example 54*

Thin organopolysiloxane elastomer tapes were prepared by compounding (by means of a two-roll mill) and heating in a thin section mold, at a temperature of 350° F. for a period of fifteen minutes, a formulation comprising:

(A) 100 parts of a linear polysiloxane gum containing 12 percent by weight diphenylsiloxane units, 0.35 percent by weight ethylvinylsiloxane units, and 87.65 percent by weight dimethylsiloxane units;

(B) 6 parts of a hydroxy-endblocked polysiloxane oil containing dimethylsiloxane units, methylphenylsiloxane units, and methylvinylsiloxane units, and having an average of one hydroxyl group bonded to each of the terminal silicon atoms;

(C) 1 part of diphenylsilanediol;

(D) 0.5 part of boric acid;

(E) 35 parts of finely-divided silica; and (F) 1.8 parts of dichlorobenzoyl peroxide.

These elastomer strips were used to prepare a series of three-ply laminates similar in structure to those of Examples 50, 51, 52 and 53 (except for the composition of the elastomer) with the aid of pressure at temperatures ranging from 250° F. to 480° F. The resulting laminates exhibited excellent elastomer-to-metal, elastomer-to-glass and elastomer-to-cloth bonds.

Elastomer strips prepared from the same formulation free of a combination of hydroxy-containing silicon materials and boric acid were not pressure-sensitive adhesive materials and could not be used to prepare laminates.

*Example 55*

An organopolysiloxane formulation was prepared by compounding the following ingredients on a two-roll mill:

(A) 100 parts of a linear polysiloxane gum containing 50 percent by weight gamma-cyanopropylmethylsiloxane units and 50 percent by weight dimethylsiloxane units;

(B) 6 parts of a hydroxy-endblocked dimethylpolysiloxane oil having an average molecular weight of about 1080 and an average hydroxy content of about 3 percent by weight with an average of one hydroxyl group bonded to each of the terminal silicon atoms;
(C) 1 part of diphenylsilanediol;
(D) 0.5 part of boric acid;
(E) 40 parts of finely-divided silica; and
(F) 2 parts of iron oxide.

This formulation was added to sufficient toluene to provide a dispersion containing about 30 percent by weight of dispersed solids. To the dispersion was added 3.5 parts of crystalline benzoyl peroxide.

A strip of No. 116 glass cloth, previously heat cleaned, was dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 10 mils.

When the glass cloth-supported tape thus prepared was spirally wound in overlapping fashion, under tension about an electric cable, it readily adhered to itself and to the electric cable without any external force to hold it in place.

The cable thus wrapped in elastomer-coated tape was heated at a temperature of 300° F. for a period of four hours. Upon examination of the specimen, it was found that the overlapped portions of the tape had fused into an essentially homogeneous cylindrical mass, and that the elastomer surfaces in contact with the surface of the cable had become strongly adhered thereto.

Glass-supported tapes prepared from glass cloth and the same formulation free of hydroxy-containing silicon materials and boric acid were not pressure-sensitive adhesive materials and would not adhere to an electric cable even after subjected to a heating treatment.

*Example 56*

An organopolysiloxane formulation was prepared by compounding the following ingredients on a two-roll mill:
(A) 100 parts of a linear polysiloxane gum containing methylvinylsiloxane units and dimethylsiloxane units;
(B) 6 parts of a hydroxy-endblocked dimethylpolysiloxane oil having an average molecular weight of about 1080 and an average hydroxy content of about 3 percent by weight with an average of one hydroxyl group bonded to each of the terminal silicon atoms;
(C) 1 part of diphenylsilanediol;
(D) 0.5 part of boric acid;
(E) 50 parts of carbon black; and
(F) 8 parts of finely-divided silica.

This formulation was added to sufficient toluene to provide a dispersion containing about 30 percent by weight of dispersed solids. To the dispersion was added 3 parts of dicumyl peroxide.

Several strips of No. 116 glass cloth, previously heat cleaned, were dipped into the dispersion, allowed to air dry, and then heated at a temperature of about 300° F. for a period of fifteen minutes in order to cure the organopolysiloxane formulation deposited thereon to an elastomer. This procedure was repeated until the overall thickness of the organopolysiloxane elastomer coating was approximately 8 mils.

The glass cloth-supported tapes thus prepared readily adhered to glass plates, steel sheets, and nylon film. When such materials were superimposed on either side of said tapes and pressure applied to the outer surfaces of the superimposed materials while heating at a temperature of about 300° F., relatively strong bonds were obtained.

What is claimed is:
1. A composition of matter suitable for use in the production of organopolysiloxane elastomers which consists essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler, and (5) an organic peroxide curing catalyst.

2. A composition of matter suitable for use in the production of silicone elastomers which consists essentially of (1) a linear diorganopolysiloxane gum, (2) a silicon compound containing at least one silicon-bonded alkoxy group and a silicon compound containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler and (5) an organic peroxide curing catalyst.

3. A composition as defined in claim 2 wherein said alkoxy-silicon compound is an alkoxy-containing polysiloxane of the general formula:

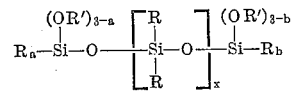

wherein R is a member selected from the group consisting of hydrocarbon radicals, halo-substituted hydrocarbon radicals, cyanoalkyl radicals, aminoalkyl radicals, and carboxyalkyl radicals; R' is a member selected from the group consisting of alkyl and aryl radicals; $a$ has a value from 0 to 2; $b$ has a value of from 0 to 3; $x$ has a value of from 2 to 35, and R as well as R' can be different group members in the molecule.

4. A composition as defined in claim 2 wherein said hydroxy-silicon compound is a hydroxy-containing polysiloxane of the general formula:

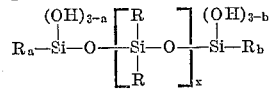

wherein R is a member selected from the group consisting of hydrocarbon radicals, halo-substituted hydrocarbon radicals, cyanoalkyl radicals, aminoalkyl radicals, and carboxyalkyl radicals; $a$ has a value from 0 to 2; $b$ has a value of from 0 to 3; $x$ has a value of from 2 to 35; and R can be different group members in the molecule.

5. A composition of matter suitable for use in the production of silicone elastomers which consists essentially of (1) a linear dihydrocarbon-substituted polysiloxane gum, (2) a hydroxy end-blocked dihydrocarbon-substituted polysiloxane oil in a total amount between about one part by weight and about 100 parts by weight per 100 parts by weight of said gum, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) an organic peroxide curing catalyst, and (5) a filler selected from the group consisting of reinforcing silicas, semi-reinforcing silicas, non-reinforcing metallic oxides, and carbon blacks.

6. A composition of matter suitable for use in the production of silicone elastomers which consists essentially of (1) a linear dihydrocarbon-substituted polysiloxane gum, (2) an alkoxy end-blocked dihydrocarbon-substituted polysiloxane oil in an amount between about one part by weight and about 100 parts by weight per 100 parts by weight of said gum, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) an organic peroxide curing catalyst, and (5) a filler selected from the group consisting of reinforcing silicas, semi-reinforcing silicas, non-reinforcing metallic oxides, and carbon blacks.

7. A composition of matter suitable for use in the production of silicone elastomers which consists essentially of a linear di-organo-substituted polysiloxane containing dimethylsiloxane units and ethylvinylsiloxane units, a silica filler, from about 1 part to about 10 parts by weight per 100 parts of the di-organo-substituted polysiloxane of diphenylsilane diol, from about 6 parts to about 20 parts by weight per 100 parts of the di-organo-substituted polysiloxane of a hydroxy-containing dimethylpolysiloxane, from about 0.1 part to about 3 parts by weight per 100 parts of the di-organo-substituted polysiloxane of boric acid and an organic peroxide curing catalyst.

8. A composition of matter suitable for use in the production of silicone elastomers which consists essentially of a linear di-organo-substituted polysiloxane containing dimethylsiloxane units and ethylvinylsiloxane units, a silica filler, from about 4 parts to about 80 parts by weight per 100 parts of the di-organo-substituted polysiloxane of diphenylsilane diol, from about 0.1 part to about 3 parts by weight per 100 parts of the di-organo-substituted polysiloxane of boric acid and an organic peroxide curing catalyst.

9. A composition of matter suitable for use in the production of silicone elastomers which consists essentially of a linear di-organo-substituted polysiloxane containing dimethylsiloxane units and ethylvinylsiloxane units, a silica filler, from about 1 part to about 10 parts by weight per 100 parts of the di-organo-substituted polysiloxane of partially hydrolyzed ethyl silicate, from about 6 parts to about 20 parts by weight per 100 parts of the di-organo-substituted polysiloxane of a hydroxy-containing dimethylpolysiloxane, from about 0.1 part to about 3 parts by weight per 100 parts of the di-organo-substituted polysiloxane of boric acid, and an organic peroxide curing catalyst.

10. A composition of matter suitable for use in the production of silicone elastomers which consists essentially of a linear diorgano-substituted polysiloxane gum containing dimethylsiloxane units, ethylvinylsiloxane units and gamma-cyanopropylmethylsiloxane units, a reinforcing filler, from about 1 part to about 10 parts per 100 parts of the diorgano-substituted polysiloxane gum of diphenyldiethoxysilane, from about 6 parts to about 20 parts by weight per 100 parts by weight of the gum of an ethoxy end-blocked dimethylpolysiloxane oil, from about 0.1 to about 4 parts by weight per 100 parts of the silicone gum of a boric acid, and an organic peroxide curing catalyst.

11. A composition of matter suitable for use in the production of silicone elastomers which consists essentially of a linear diorgano-substituted polysiloxane gum containing dimethylsiloxane units and 3,3,3-trifluoropropylmethylsiloxane units, a reinforcing filler, from about 1 part to about 10 parts per 100 parts of the diorgano-substituted polysiloxane gum of ethyltriethoxysilane, from about 0.1 part to about 4 parts per 100 parts of the diorgano-substituted polysiloxane gum of boric acid and an organic peroxide curing catalyst.

12. A process for producing a pressure-sensitive adhesive polysiloxane elastomer which comprises forming a compound consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler, and (5) an organic peroxide curing catalyst, and subjecting said compound to a heat-curing treatment at a temperature sufficiently elevated to produce a polysiloxane elastomer.

13. A process for producing pressure-sensitive adhesive silicone elastomers which comprises forming a mixture consisting essentially of (1) a linear diorganopolysiloxane gum, (2) a hydroxy end-blocked dihydrocarbon-substituted polysiloxane oil in an amount between about one part by weight and about 100 parts by weight per 100 parts by weight of said gum, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler, and (5) an organic peroxide curing catalyst, and heating the mixture at a temperature sufficiently elevated to cure said compound and thereby produce a silicone elastomer.

14. A process for producing pressure-sensitive adhesive silicone elastomers which comprises forming a mixture consisting essentially of (1) a linear diorganopolysiloxane gum, (2) an alkoxy end-blocked dihydrocarbon-substituted polysiloxane oil in an amount between about one part by weight and about 100 parts by weight per 100 parts by weight of said gum, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler, and (5) an organic peroxide curing catalyst, and heating the mixture at a temperature sufficiently elevated to produce a cured silicone elastomer.

15. A fusible silicone elastomer comprising a fully cured silicone gum compound consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler and (5) an organic peroxide curing catalyst.

16. A composite article comprising a solid material having bonded directly to a surface thereof a pressure-sensitive organopolysiloxane elastomer, said elastomer being the cured product of an organopolysiloxane formulation consisting essentially of (1) a diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler and (5) an organic peroxide curing catalyst.

17. A composite article comprising a solid material having bonded directly to a surface thereof a pressure-sensitive organopolysiloxane elastomer, said elastomer being the cured product of an organopolysiloxane formulation consisting essentially of (1) a linear diorganopolysiloxane gum, (2) an alkoxy end-blocked dihydrocarbon-substituted polysiloxane oil in an amount between about one part by weight and about 100 parts by weight per 100 parts by weight of said gum, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler selected from the class consisting of silica, calcium carbonate, iron oxide and carbon black and (5) an organic peroxide curing catalyst.

18. A composite article comprising a solid material having bonded directly to a surface thereof a pressure-sensitive organopolysiloxane elastomer, said elastomer being the cured product of an organopolysiloxane formulation consisting essentially of (1) a linear diorganopolysiloxane gum, (2) a hydroxy end-blocked dihydrocarbon-substituted polysiloxane oil in an amount between about one part by weight and about 100 parts by weight per 100 parts by weight of said gum, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler selected from the class consisting of silica, calcium carbonate, iron oxide and carbon black and (5) an organic peroxide curing catalyst.

19. A composite article comprising a solid material having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 7.5 parts by weight of an ethoxy end-blocked dimethylpolysiloxane oil, about one part by weight of diphenylsilanediol and about 7.5 parts by weight of a hydroxy end-blocked dimethylpolysiloxane oil, (3) about 0.5 part by weight of boric acid, (4) silica and calcium carbonate and (5) benzoyl peroxide.

20. A composite article comprising a solid material having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 15 parts by weight of an ethoxy end-blocked dimethylpolysiloxane oil, and about one part by weight of diphenyldiethoxysilane, (3) about 0.5 part by weight of boric acid (4) silica and calcium carbonate and (5) benzoyl peroxide.

21. A composite article comprising a solid material having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 15 parts by weight of a hydroxy end-blocked dimethylpolysiloxane oil, and about one part by weight of diphenylsilanediol, (3) about 0.5 part by weight of boric acid, (4) silica and calcium carbonate and (5) benzoyl peroxide.

22. A process for preparing a composite article, said composite article comprising a solid material having bonded directly to a surface thereof a pressure-sensitive organopolysiloxane elastomer, which process comprises providing a cured elastomer product of an organopolysiloxane formulation consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler and (5) an organic peroxide curing catalyst and applying said cured elastomer product to the surface of said solid material under such conditions of heat and pressure as to firmly adhere said cured elastomer to said solid material.

23. An unsupported pressure-sensitive adhesive tape which comprises a heat-cured organopolysiloxane formulation, said formulation consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler, and (5) an organic peroxide curing catalyst.

24. The combination which comprises a layer of unsupported pressure-sensitive adhesive silicone elastomer having at least one surface thereof in contact with a layer of a material toward which said elastomer exhibits a limited degree of adhesion and from which said elastomer can be readily stripped away, said elastomer comprising a heat-cured composition consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler, and (5) an organic peroxide curing catalyst.

25. The combination which comprises a layer of supported pressure sensitive adhesive elastomer having at least one surface thereof in contact with a layer of a material toward which said elastomer exhibits a limited degree of adhesion and from which said elastomer can be readily stripped away, said supported elastomer comprising a solid flexible base member having bonded directly to a surface thereof a pressure-sensitive organopolysiloxane elastomer, said elastomer being the cured product of an organopolysiloxane formulation consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler and (5) an organic peroxide curing catalyst.

26. A pressure-sensitive adhesive tape comprising a solid flexible base member having bonded directly to a surface thereof a pressure-sensitive organopolysiloxane elastomer, said elastomer being the cured product of an organopolysiloxane formulation consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler and (5) an organic peroxide curing catalyst.

27. A pressure-sensitive adhesive tape comprising a solid flexible base member having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 7.5 parts by weight of an ethoxy end-blocked dimethylpolysiloxane oil, about 7.5 parts by weight of a hydroxy end-blocked dimethylpolysiloxane oil and about one part by weight of diphenylsilanediol, (3) about 4 parts by weight of boric acid, (4) silica and iron oxide and (5) benzoyl peroxide.

28. A pressure-sensitive adhesive tape comprising a solid flexible base member having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 15 parts by weight of an ethoxy end-blocked dimethylpolysiloxane oil and about one part by weight of diphenyldiethoxy silane, (3) about 0.5 part by weight of boric acid, (4) silica and iron oxide and (5) benzoyl peroxide.

29. A pressure-sensitive adhesive tape comprising a solid flexible base member having bonded directly to a surface thereof a pressure-sensitive organopolysiloxane elastomer, said elastomer being the cured product of an organopolysiloxane formulation consisting essentially of (1) about 100 parts by weight of a linear diorganopolysiloxane gum, (2) about 15 parts by weight of a hydroxy end-blocked dimethylpolysiloxane oil and about one part by weight of diphenylsilanediol, (3) about 0.05 part by weight of boric acid, (4) silica and iron oxide and (5) benzoyl peroxide.

30. A tape roll which comprises a right circular cylindrical core, an unsupported pressure-sensitive adhesive tape wound in concentric overlapping layers around said core, and an interlayer material toward which said tape exhibits a limited degree of adhesion and from which said tape can be readily stripped away separating said layers of tape, said interlayer material being selected from the group consisting of paper, wax coated paper, nylon, cellophane, polymers and copolymers of vinyl chloride and vinylidene chloride, polyethylene terephthalate resin and polyolefins, and said tape consisting essentially of a heat-cured composition comprising (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing material selected from the group consisting of boric acids, the esters of the boric acids, boron anhydride, the boron hydrides, boron complexes formed by the reaction of a boron hydride with a compound selected from the class consisting of ammonia and organic amines, alkali metal derivatives of the boric acids and alkaline earth metal derivatives of the boric acids in an amount between about 0.05 part by weight and about 10 parts by weight per 100 parts by weight of said gum, (4) a filler, and (5) an organic peroxide curing catalyst.

31. A tape roll which comprises a right circular cylindrical core, a pressure-sensitive adhesive tape wound in concentric overlapping layers around said core, and an interlayer material toward which said tape exhibits a limited degree of adhesion and from which said tape can be readily stripped away separating said layers of tape, said interlayer material being selected from the group consisting of paper, wax coated paper, nylon, cellophane, polymers and copolymers of vinyl chloride and vinylidene chloride, polyethylene terephthalate resin and polyolefins, and said tape comprising a solid flexible base member having bonded directly to a surface thereof a pressure-sensitive organopolysiloxane elastomer, said elastomer being the cured product of an organopolysiloxane formulation consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boric acids and alkaline earth metal derivatives of boric acids in an amount between about 0.05 part by weight and about 10 parts by weight per 100 parts by weight of said gum, (4) a filler and (5) an organic peroxide curing catalyst.

32. A duct structure comprising a conduit member of solid material, said conduit having bonded directly to the surfaces thereof a heat-cured elastomer, said elastomer prior to curing consisting essentially of (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount between about one part by weight and about 100 parts by weight per 100 parts by weight of said gum, said silicon compounds being selected from the class consisting of silanes, silicates, polysilicates and organopolysiloxane oils, (3) a boron-containing compound selected from the group consisting of the boric acids, the esters of boric acid, boron anhydride, the boron hydrides, boron complexes formed by the reaction of a boron hydride with a compound selected from the class consisting of ammonia and organic amines, alkali metal derivatives of boris acids and alkaline earth metal derivatives of boric acids, in an amount between about 0.05 part by weight and about 10 parts by weight per 100 parts by weight of said gum, (4) a filler and (5) an organic peroxide curing catalyst.

References Cited in the file of this patent

UNITED STATES PATENTS

| | | |
|---|---|---|
| 2,405,675 | Southwick et al. | Aug. 13, 1946 |
| 2,644,805 | Martin | July 7, 1953 |
| 2,721,857 | Dickmann | Oct. 25, 1955 |
| 2,736,721 | Dexter | Feb. 28, 1956 |
| 2,744,079 | Kilbourne et al. | May 1, 1956 |
| 2,784,135 | Woodling et al. | Mar. 5, 1957 |
| 2,814,601 | Currie et al. | Nov. 26, 1957 |

UNITED STATES PATENT OFFICE
CERTIFICATE OF CORRECTION

Patent No. 3,146,799 September 1, 1964

Frank Fekete

It is hereby certified that error appears in the above numbered patent requiring correction and that the said Letters Patent should read as corrected below.

Column 1, line 23, for "728,04" read -- 728,044 --; column 9, line 58, for "any" read -- my --; column 10, line 49, for "group" read -- groups --; column 16, line 65, for "and" read -- any --; column 32, lines 73 and 74, for "adhesive" read -- abhesive --; column 36, line 61, for "silica (Cab-O-Sil), 12 parts of an ethoxy endblocked di-" read -- amount by weight of 12 percent and having an average of --; column 42, line 54, for "thtin" read -- thin --; column 45, TABLE 34-1, first column, line 5 thereof, for "methyloplysiloxane" read -- methylpolysiloxane --; column 48, line 59, for "dischloro-" read -- dichloro- --; column 52, line 29, for "diphenyl-silanediol" read -- diphenylsilanediol --; column 66, line 24, for "boris" read -- boric --.

Signed and sealed this 17th day of August 1965.

(SEAL)
Attest:

ERNEST W. SWIDER
Attesting Officer

EDWARD J. BRENNER
Commissioner of Patents